US011516071B2

(12) United States Patent
Karapantelakis et al.

(10) Patent No.: US 11,516,071 B2
(45) Date of Patent: Nov. 29, 2022

(54) METHOD AND SYSTEM FOR ROOT CAUSE ANALYSIS ACROSS MULTIPLE NETWORK SYSTEMS

(71) Applicant: Telefonaktiebolaget LM Ericsson (publ), Stockholm (SE)

(72) Inventors: Athanasios Karapantelakis, Solna (SE); Rafia Inam, Västerås (SE); Yifei Jin, Solna (SE); Ioannis Fikouras, Stockholm (SE); Qiang Li, Täby (SE); Konstantinos Vandikas, Solna (SE); Michael Buisman, Kildare (IE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/593,204

(22) PCT Filed: Mar. 12, 2019

(86) PCT No.: PCT/EP2019/056183
§ 371 (c)(1),
(2) Date: Sep. 10, 2021

(87) PCT Pub. No.: WO2020/182300
PCT Pub. Date: Sep. 17, 2020

(65) Prior Publication Data
US 2022/0158890 A1    May 19, 2022

(51) Int. Cl.
*H04L 41/0631* (2022.01)
*H04L 41/0604* (2022.01)
(Continued)

(52) U.S. Cl.
CPC ...... *H04L 41/0636* (2013.01); *H04L 41/0627* (2013.01); *H04L 41/0866* (2013.01); *H04L 43/50* (2013.01)

(58) Field of Classification Search
CPC ............ H04L 41/0631; H04L 41/0636; H04L 41/0866
See application file for complete search history.

(56) References Cited

U.S. PATENT DOCUMENTS 10,061,637 B1 *   8/2018  Halbersberg .......... G06F 11/079
2011/0154367 A1   6/2011  Gutjahr et al.
(Continued)

OTHER PUBLICATIONS

International Preliminary Reporton Patentability, PCT App. No. PCT/EP2019/056183, dated Sep. 23, 2021, 9 pages.
(Continued)

*Primary Examiner* — Nicholas P Celani
(74) *Attorney, Agent, or Firm* — Nicholson De Vos Webster & Elliott LLP

(57) ABSTRACT

Method and system for Root Cause Analysis (RCA) across multiple network systems. Update information of a first local root cause analysis mechanism is received. An RCA controller generates, based on the update information, a new node to be added to a global root cause decision tree, where the global root cause decision tree is to be shared by at least two of the plurality of network operators. The RCA controller requests storage of the new node in a distributed ledger that is shared by network operators. The RCA controller participates in a verification operation of the new node. In response to determining that the verification operation is successful, the RCA controller adds an entry including the new node to the distributed ledger as part of the global root cause decision tree. Alternatively, when the verification operation is not successful, the new node is not added to the distributed ledger.

19 Claims, 20 Drawing Sheets

(51) Int. Cl.
*H04L 41/0866* (2022.01)
*H04L 43/50* (2022.01)

(56) References Cited

U.S. PATENT DOCUMENTS

| | | | | |
|---|---|---|---|---|
| 2012/0143795 | A1* | 6/2012 | Han | G06F 11/079 |
| | | | | 714/E11.029 |
| 2012/0260141 | A1* | 10/2012 | Bhagwan | G06N 5/025 |
| | | | | 714/E11.203 |
| 2015/0333998 | A1* | 11/2015 | Gopalakrishnan | H04L 41/142 |
| | | | | 370/244 |
| 2018/0082296 | A1 | 3/2018 | Brashers | |
| 2018/0248880 | A1 | 8/2018 | Sardesai et al. | |
| 2019/0356553 | A1* | 11/2019 | Mermoud | G06K 9/6282 |

OTHER PUBLICATIONS

International Search Report and Written Opinion for Application No. PCT/EP2019/056183, dated Oct. 7, 2019, 12 pages.

* cited by examiner

| Network Operator Policies 230 | | |
|---|---|---|
| Policy ID 212 | Operator ID (e.g., HNI[MCC MNC]) 214 | Global Root Cause Tree ID 216 |
| 1 | {289 88, 544 11, 213 03} | Global Tree 1 |
| 2 | {426 04, 400 02} | Global Tree 2 |
| 3 | {202 01, 202 03, 202 10, 202 05} | Global Tree 3 |

Fig. 2C

| Geofencing Policies 240 | |
|---|---|
| Policy ID 222 | Operator ID (e.g., MCC)) 214 |
| 1 | {202, 240, 234} |
| 2 | {302, 310} |
| 3 | {412, 400, 470, 426} |

Fig. 2D

METHOD AND SYSTEM FOR ROOT CAUSE ANALYSIS ACROSS MULTIPLE NETWORK SYSTEMS

CROSS-REFERENCE TO RELATED APPLICATIONS

This application is a National stage of International Application No. PCT/EP2019/056183, filed Mar. 12, 2019, which is hereby incorporated by reference.

TECHNICAL FIELD

The present disclosure relates to the field of communication networks; and more specifically, to mechanisms for enabling a root cause analysis across multiple network systems.

BACKGROUND

Root cause analysis (RCA) is a systematic process for identifying root causes of faults or problems and developing an approach for responding to them. RCA is used in management of a telecommunication network for determining events that are initiating causes of a condition or a causal chain (the root cause) leading to faults or problems in the communication network. RCA is further used for finding a way to prevent these problems and faults in the communication network. In communication networks, RCA is typically performed in a single network in isolation from other networks. For example, RCA can be used to take remedial action to a problem in a network based on data observed or analyzed on similar issues in the same network.

As communication networks grow more complex, such as $5^{th}$ generation (5G) networks (e.g., 5G hybrid networks), the number of potential events that will impact network performance and customer experience is also growing. In addition, since new communication technologies, such as 5G, are typically deployed progressively across the globe and across multiple operators, with varying architectures and services delivered on top of them, there is a need to perform root cause analysis across multiple networks.

Until recently, sharing of data such as RCA information between network operators has not been possible, as communication networks are traditionally designed to work in an isolated manner, separate from one another. Many network operators may not explicitly want to share data about network operation. For example, network operators are not willing to disclose to competitors methods leading to root cause identification. In addition, even if operators are willing to share data with other operators, regulations may prohibit sharing this data across geographical borders by enforcing what is known as geofencing. For example, current regulations may not allow operators from different countries (e.g., European countries and south-east Asian countries) to use of a same root cause decision mechanism of radio site alarms. Further, there are no current mechanisms or technologies that allow the disclosure and sharing of RCA information between different network providers. For example, a key issue of current 3rd Generation Partnership Project (3GPP) service capability exposure being that it is limited to exposing information between network nodes of a same network.

Therefore, while functionalities in new communication network technologies call for more collaboration and sharing of resources between network operators, there are no current technologies or mechanisms for enabling these operators to share root cause analysis information while also maintaining a needed degree of confidentiality or regulatory conformance. This creates silos of local optima, where insight gained from root cause analysis in a network operated by one network operator does not help in root cause analysis in another network operated by a different network operator, consequently leading to a number of sub-optimal root cause analysis processes as a whole.

SUMMARY

According to one aspect, a method performed by a network node for enabling root cause analysis in across a plurality of network systems is described. The method includes receiving update information of a first local root cause analysis mechanism of a first network operator from a plurality of network operators; generating, based on the update information, a new node to be added to a global root cause decision tree, wherein the global root cause decision tree is to be shared by at least two of the plurality of network operators; and requesting storage of the new node in a distributed ledger that is shared by the plurality of network operators. The method further includes participating in a verification operation of the new node; and responsive to determining that the verification operation is successful, adding an entry including the new node to the distributed ledger as part of the global root cause decision tree.

According to one aspect, a computer program product is described. The computer program product having stored thereon a computer program comprising instructions which, when executed on processing circuitry, cause the processing circuitry to carry out operations of a method. The method includes receiving update information of a first local root cause analysis mechanism of a first network operator from a plurality of network operators; generating, based on the update information, a new node to be added to a global root cause decision tree, wherein the global root cause decision tree is to be shared by at least two of the plurality of network operators; and requesting storage of the new node in a distributed ledger that is shared by the plurality of network operators. The method further includes participating in a verification operation of the new node; and responsive to determining that the verification operation is successful, adding an entry including the new node to the distributed ledger as part of the global root cause decision tree.

According to one aspect, a computer program is described. The computer program comprising instructions which, when executed on processing circuitry, cause the processing circuitry to carry out a method. The method includes receiving update information of a first local root cause analysis mechanism of a first network operator from a plurality of network operators; generating, based on the update information, a new node to be added to a global root cause decision tree, wherein the global root cause decision tree is to be shared by at least two of the plurality of network operators; and requesting storage of the new node in a distributed ledger that is shared by the plurality of network operators. The method further includes participating in a verification operation of the new node; and responsive to determining that the verification operation is successful, adding an entry including the new node to the distributed ledger as part of the global root cause decision tree.

According to another aspect, a network node for enabling root cause analysis in across a plurality of network systems is described. The network node comprises processing circuitry; and a computer memory storing a set of computer readable instructions that when executed by the processing circuitry cause the network node to: receive update information of a first local root cause analysis mechanism of a first network operator from a plurality of network operators, generate, based on the update information, a new node to be added to a global root cause decision tree, wherein the global root cause decision tree is to be shared by at least two of the plurality of network operators, request storage of the new node in a distributed ledger that is shared by the plurality of network operators, participate in a verification operation of the new node, and responsive to determining that the verification operation is successful, add an entry including the new node to the distributed ledger as part of the global root cause decision tree.

BRIEF DESCRIPTION OF THE DRAWINGS

The inventive concept may best be understood by referring to the following description and accompanying drawings that are used to illustrate embodiments of the inventive concept. In the drawings:

FIG. 2C illustrates a block diagram of an exemplary table including policies that can be set for mobile network operators (MNOs), in accordance with some embodiments.

FIG. 2D illustrates a block diagram of an exemplary table including geofencing policies that can be set for one or more network operators, in accordance with some embodiment.

DETAILED DESCRIPTION

Figure 1:
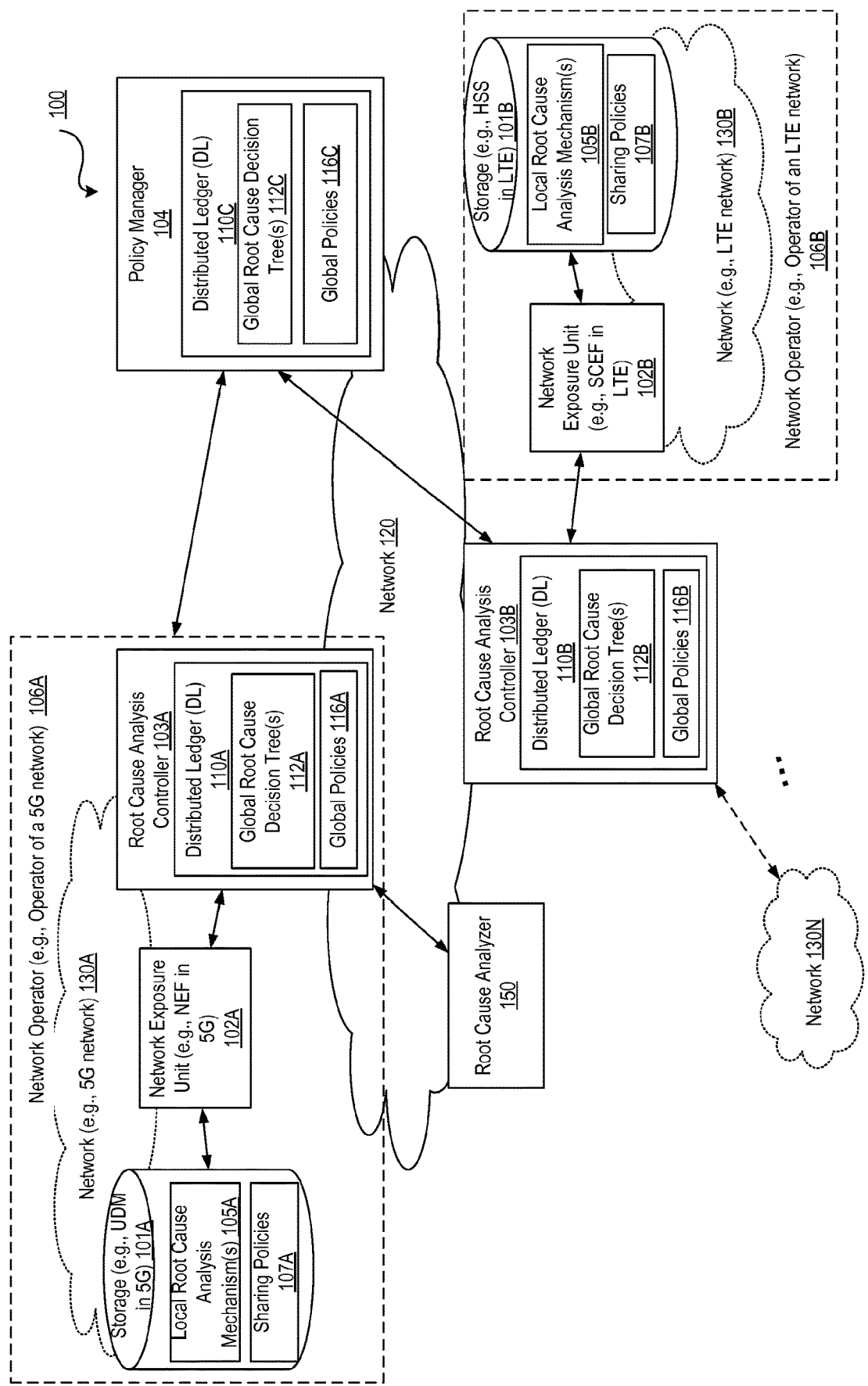
FIG. 1 illustrates a block diagram of an exemplary system for enabling root cause analysis across multiple network systems, in accordance with some embodiments.

The following description describes methods and apparatus for performing root Cause analysis across multiple network systems. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present disclosure. It will be appreciated, however, by one skilled in the art that the present disclosure may be practiced without such specific details. In other instances, control structures, gate level circuits and full software instruction sequences have not been shown in detail in order not to obscure the present disclosure. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the inventive concept. However, such notation should not be taken to mean that these are the only options or optional operations, and/or that blocks with solid borders are not optional in certain embodiments of the inventive concept.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

General Overview

A communication network operator may rely on one or more root cause analysis mechanisms to perform RCA. For example, network operators may implement one or more of these mechanisms as local root cause decision trees and use one of these trees based on a particular context and goal (e.g., detecting hardware faults, faults in transport network or core, etc.). In other embodiments, the network operators may rely on other mechanisms (than decision trees) to perform root cause analysis. The RCA mechanisms can be used for root cause analysis in one or multiple networks operated/owned by a network operator. The RCA mechanisms (e.g., decision trees) can be built over time, with contributions from field service technicians, network managers, and others involved in network operations of the network in a learning phase.

As mentioned above, each network operator is typically restricted in using its own RCA mechanisms and is not able to share with or learn from other network operators other RCA mechanisms. Therefore, while functionalities in new communication network technologies call for more collaboration and sharing of resources between network operators, there are no current technologies or mechanisms for enabling these operators to share root cause analysis information while also maintaining a needed degree of confidentiality or regulatory conformance. This creates silos of local optima, where insight gained from root cause analysis in a network operated by one network operator does not help in root cause analysis in another network operated by a different network operator, consequently leading to a number of sub-optimal root cause analysis processes as a whole.

A method and system for combining knowledge for root-cause analysis from different network operators are described. The system presented herein enables the generation of one or more global root cause decision trees where the global decision trees are to be shared with multiple network operators for performing RCA in their respective networks. The system records the global root cause decision trees in a distributed ledger structure that can be accessed and trusted by multiple network operators and/or policy entities. The distributed ledger structure is replicated among multiple root cause analysis (RCA) controllers that form the distributed ledger network. The RCA controllers translate information from local root cause analysis mechanisms into nodes of a global root cause decision tree stored in the distributed ledger. The RCA controllers keep track of updates that occur in the local root cause analysis mechanisms and update the global tree accordingly. The RCA controllers ensure that individual local root cause updates are merged properly, normalizing inputs and outputs in the global decision tree as necessary.

In one embodiment, an RCA controller receives an update information of a first local root cause analysis mechanism of a first network operator from multiple network operators. The update information includes input data format, output data format, decision module information, and an identifier of the first network operator. The RCA controller generates, based on the update information, a new node to be added to a global root cause decision tree, where the global root cause decision tree is to be shared by at least two of the plurality of network operators. The RCA controller requests storage of the new node in a distributed ledger that is shared by the plurality of network operators. The new node includes a type of node, an identifier of the new node, an identifier of a parent node in the global root cause decision tree, input data format, output data format, decision module information, and an identifier of the first network operator. The RCA controller participates in a verification operation of the new node. In responsive to determining that the verification operation is successful, the RCA controller adds an entry including the new node to the distributed ledger as part of the global root cause decision tree. Alternatively, when the verification operation is not successful, the new node is not added to the distributed ledger.

The embodiments presented herein allow multiple network operators to have access to the same root cause analysis decision trees. This enables the network operators to consider similarities in root causes of problems across multiple networks and helps to find the best course of remedial action for predicted events for all the networks. The present embodiments allow a secure sharing of root cause decision trees without disclosure of confidential information to non-authorized operators and without access to sensitive data. In addition, the present solution is generic and can be applied for performing root cause analysis at multiple levels, e.g., for radio site alarms, transport/backhaul, core network, or any other types of problem analysis and detection in a network. In some embodiments, the solution is implemented based on standardized service exposure functions for exposing local information updates to the RCA controllers.

FIG. 1 illustrates a block diagram of an exemplary system 100 that can be used to enable root cause analysis across multiple network systems, in accordance with some embodiments. The system 100 includes a set of networks 130A-N, a network 120, and a policy manager 104.

Each one of the networks 130A-N, can be a wireless, wired or a combination of wireless and wired networks that belong to distinct network operators. For simplicity, only a small set of components are depicted for each one of the networks 130A, 130B, and 120. In practice, a network (e.g., wireless or wired) may further include any additional elements suitable to support communication between different network devices (e.g., between wireless devices, between a wireless device and another communication device, such as a landline telephone, a service provider, or any other network node or end device, or between several wired network devices). The networks 130A-N and 120 may provide communication and other types of services to one or more network devices to facilitate the network devices' access to and/or use of the services provided by, or via, the respective network. Although the subject matter described herein may be implemented in any appropriate type of networking system using any suitable components, the embodiments disclosed herein may be described in relation to several wireless networks.

For example, each one of the networks 130A-N can be a wireless network that offers wireless network services to multiple wireless devices' users. The wireless networks may comprise and/or interface with any type of communication, telecommunication, data, cellular, and/or radio network or other similar type of system. In some embodiments, the wireless networks may be configured to operate according to specific standards or other types of predefined rules or procedures. Thus, particular embodiments of the wireless networks may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

The network 130A-N and 120 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices. In different embodiments, the networks may comprise any number of wired or wireless networks, base stations, controllers, wireless devices, relay stations, and/or any other components or systems that may facilitate or participate in the communication of data and/or signals whether via wired or wireless connections.

As used herein, a network node refers to equipment capable, configured, arranged and/or operable to communicate directly or indirectly with a wireless device and/or with other network nodes or equipment in the networks to enable and/or provide access to the network device and/or to perform other functions (e.g., administration) in the network. More generally, network nodes may represent any suitable device (or group of devices) capable, configured, arranged, and/or operable to enable and/or provide a network device with access to a respective network or to provide some service to a network device that has accessed the network.

Each one of the networks 130A-N, and 120 are operated/owned by a respective network operator. A network operator (e.g., network operator 106A, 106B), also known as a network service provider, is a provider of network communications services that owns or controls all the elements necessary to sell and deliver services to an end user in the respective network. For example, a network operator can be a mobile network operator, MNO, that is a provider of wireless communication services. The MNO owns or controls all the elements necessary to sell and deliver services to an end user in a wireless network including radio spectrum allocation, wireless network infrastructure, back haul infrastructure, billing, customer care, provisioning computer systems and marketing and repair organizations. Typically, a mobile network operator owns or controls access to a radio spectrum license from a regulatory or government entity. Further, the network operator owns or controls the elements of the network infrastructure necessary to provide services to subscribers over the licensed spectrum.

The system includes a first network operator 106A. The first network operator 106A can be a mobile network operator, e.g., an operator of a 5G network. In this first example, the network operator 106A owns and operates a first network 130A. The network 130A includes a root cause analysis controller 103A, referred to herein after as RCA 103A, a network exposure unit 102A, and a storage system 101A. For simplicity, only a small set of components are depicted for the network 130A. In practice, the network 130A may further include any additional elements suitable to support communication between different network devices (e.g., between wireless devices or between a wireless device and another communication device, such as a landline telephone, a service provider, or any other network node or end device, or between several wired network devices). While FIG. 1 shows that the first network operator 106A operates a single network 130A, in other embodiments, the network operator 106A can operate multiple networks.

The network 130A includes a storage 101A. The storage 101A is included in a network node that is accessible only to entities authorized by the network operator 106A. In some embodiments, the storage 101A is operative to store and update the database containing all the user subscription information. The storage 101A may further be operative to generate security information from user identity keys. Security information can be used to ensure data and signaling transmitted between the network and the terminal is neither eavesdropped nor altered. For example, the storage 101A can be a 3GPP-standardized data storage entity known as Home Subscriber Server (HSS) in LTE mobile networks or Unified Data Management (UDM) in 5G mobile networks.

The storage 101A is operative to store local RCA mechanisms 105A and sharing policies 107A. The network operator 106A has ownership of the local RCA mechanisms. The RCA mechanisms 105A are local RCA mechanisms that can be used for identifying root causes for issues within the network 130A. The RCA mechanisms 105A can be stored based on one or more data structures that enable the execution of a root cause analysis for the network 130A. In one non-limiting example, a local decision tree can be used to represent one or more of the RCA mechanisms 105A. As will be discussed below, while in some embodiments, the local RCA mechanisms may have the same format and structure (e.g., local decision tree) as the global RCA mechanism that is recorded in the distributed ledger 110, e.g., the global decision tree, in other embodiments, the local RCA mechanisms have different formats and structure than the global RCA mechanism.

Figure 2A:
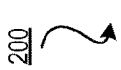
FIG. 2A illustrates a block diagram of exemplary data of a local root cause mechanism, in accordance with some embodiments.
Figure 2B:
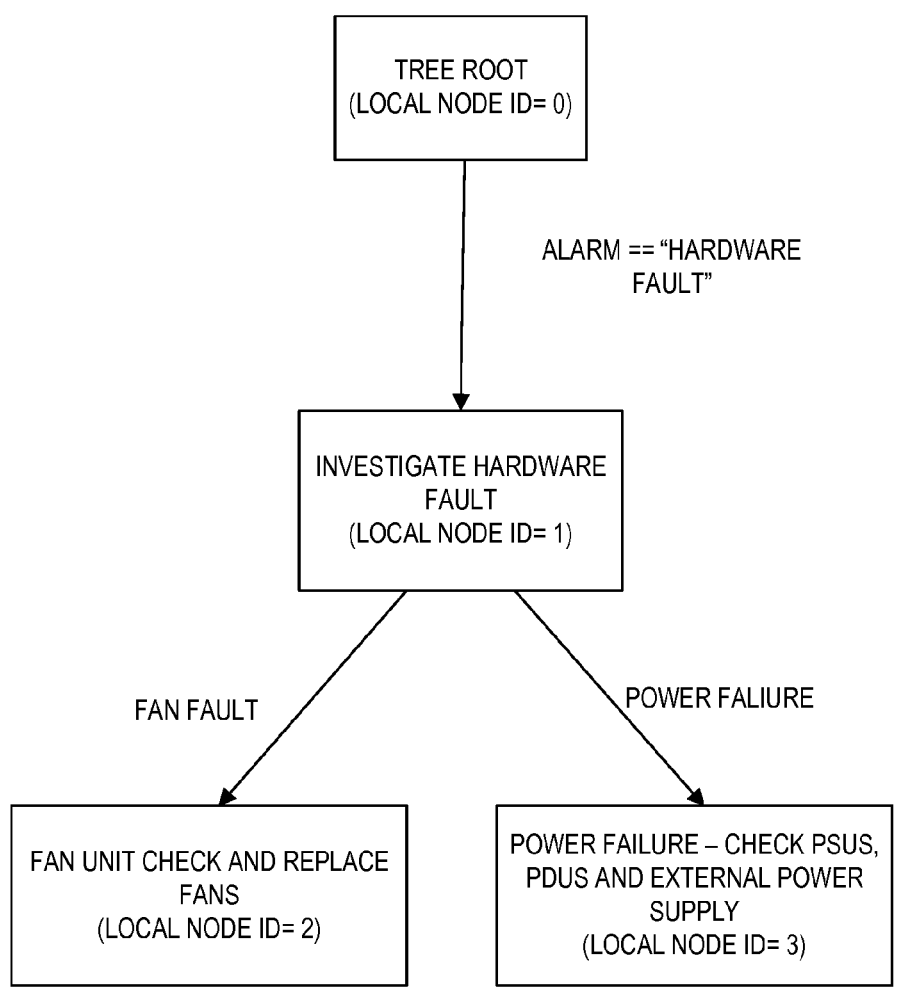
FIG. 2B illustrates a block diagram of a tree structure for representing local root cause mechanism data, in accordance with some embodiments.

FIG. 2A illustrates a block diagram of exemplary data of a local root cause mechanism that can be stored in a storage 101A of a network 106A, in accordance with some embodiments. FIG. 2B illustrates a block diagram of a tree structure for representing local root cause mechanism data, in accordance with some embodiments. While the example of FIG. 2A will be described with respect to the tree structure of FIG. 2B, in other embodiments, the RCA data of FIG. 2A can be represented or stored in a different data structure without departing from the scope of the present embodiments. Each one of the entries of the table 200 can be represented by a node in the decision tree 220. Each one of the entries includes input data format 202, output data format 206, a branching condition 204, decision module information 208, and root cause analysis 210.

The input data format 202 includes the format of the input data. In some non-limiting examples, the input data format can be a reference to an ontology of formats, e.g., units of measurement ontology, or other format ontologies. For example, the first entry in the table 200 indicates that the format of the input data can be found at the hyperlink "http://www.ontologies.com/data/metrics#alarmDescription". In this example, the second entry and the third entry in the table 200 indicate that the format of their input is the same and can be found at the hyperlink "http://www.ontologies.com/data/metrics#hwFaultIndicator." Other examples of formats can be used without departing from the scope of the present embodiments. For example, instead of including a link to a location where the format is stored, the actual format of the input data can be stored in the storage 101A as part of the RCA mechanism 105A.

The output data format 206 indicates the format of the output data. In some non-limiting examples, the output data format can be a reference to an ontology of formats, e.g., units of measurement ontology, or other format ontologies. For example, the first entry in the table 200 indicates that the format of the output data can be found at the hyperlink "http://www.ontologies.com/data/metrics#hwFaultIndicator". In this example, the second entry and the third entry in the table 200 indicate that the format of their input is the same and can be found at the hyperlink "http://www.ericsson.com/ontologies/data/metrics#rootCause-Description." Other examples of formats can be used without departing from the scope of the present embodiments. For example, instead of including a link to a location where the format is stored, the actual format of the output data can be stored in the storage 101A as part of the RCA mechanism 105A.

Each entry of the table 200 further includes a decision module information 208. The decision module information provides information on how to reach and use a decision module for the particular input and output combination. The decision module information can include an Internet Protocol (IP) address, a port and an Application Programming Interface (API) description on accessing the functionality provided by the decision module. The decision module can be located within the network 106A and can perform the actual root cause decision determination of the RCA. For example, the decision module information 208 can be a pointer to an operator's internal network node that provides the decision support service.

Each entry of the table 200 further includes a branching condition 204. The branching condition of a current entry represents the condition that needs to be satisfied to lead from a previous entry to the current entry. For example, when referring to the second entry of the table 200, a branching condition "alarm=="HardwareFault"" (which in this example refers to an alarm that was triggered for a hardware fault in the network 106A) needs to be satisfied to reaching that entry.

When the RCA mechanism is represented based on a decision tree, e.g., decision tree 220, each node has a local node identifier 201, which uniquely identifies the node in the local tree. Each node is further associated with a local parent identifier (local parent ID) 203 that uniquely identifies the parent of the local node in the decision tree 220. In some embodiments, the entries may further be associated with an identifier of the operator (not illustrated). For example, the first entry in the table 200 corresponds to the node with local node identifier 1, where the local node identifier uniquely identifies the node in the local decision tree 220. In this example, the branching condition "alarm=="HardwareFault"" when satisfied allows to move from the root node, which is a parent node with ID=0, to the local node with ID 1.

While the example of network 106A is discussed with reference to a single local RCA mechanism stored in the storage 101A, the network 106A may have access to multiple local RCA mechanisms that can be used for root cause analysis of various problems and applications in the network 106A.

Referring back to FIG. 1, the storage 101A is further to store the sharing policies 107A. In some embodiments, the sharing policies 107A include two types of policies, a network operator policies and geofencing policies. In one non-limiting example, the network operator policies represent information related to multilateral agreements established between the network operator 106A and other network operators for sharing RCA data. For example, the policies stored in 107A identify which network operators can share data with the operator 106A. The geofencing policies can identify which network operators can share RCA data based on geographical location and geographical based treaties and agreements (e.g., agreements between countries, international treaties, etc.).

Referring back to FIG. 1, the network 106A includes a network exposure unit (NEU) 102A. NEU 102A is operative to expose capabilities and events, and to securely provision of information from external applications (e.g., Application servers) to components of the network 106A. Thus, the network exposure unit 102A allows external components such as the controller 103A to access and communicate securely with different elements of the network 106A, such as the storage 101A. The information exchanged through the NEU 102A can include network device-related information (e.g. ND reachability and monitoring, ND footprint, QoS for ND session), network configuration parameters (e.g. Power-Saving Mode—PSM and extended discontinuous reception), billing-related information (e.g. sponsored data, allowing third-party enterprise change billing party in a session), coverage restriction control and IoT-related packet flow description (allowing configuration of patent flows—i.e. information allowing sensors to pass data to a server). In particular the information exchanged through the NEU 102A can include updates to the local RCA mechanisms 105A and updates to the sharing policies 107A.

The network 130A further includes a root cause analysis (RCA) controller 103A. The RCA controller 103A is a network node that is part of the network 130A. While illustrated as a separate network node in the network 130A, the RCA controller 103A can be part of another logical entity in the network 130A. For example, the RCA controller 103A and the storage 101A can be located in a same network device. Alternatively, the RCA controller 130A and the NEU 102A can be located in a same network device. The RCA controller 130A enables the tracking of the creation and updates of local RCA mechanisms 105A and/or of the of the sharing policies 107A. The controller 103A is operative to generate, based on the local updates detected either in the local RCA mechanisms 105A or in the sharing policies 107A, a global entry that can be added to the distributed ledger. A root cause analysis mechanism can be reduced to a decision tree structure. In some embodiments, the global entry can be a node of a global root cause decision tree. In the following description a decision tree and root cause decision tree are used interchangeably to refer to a root cause analysis mechanism reduced to a decision tree structure. The RCA controller 103A is further operative to perform, upon receipt of a request, a root cause analysis using a global root cause decision tree that is stored at the distributed ledger.

The system further includes at least one other network, network 130B. In some embodiments, the system may include more than two networks that are operative to share root cause analysis mechanisms. Similarly to the network 130A, the network 130B includes a storage 101B and a network exposure unit 102B. The storage 101B is similar to local storage 101A and is operative to store local RCA mechanisms 105B. In some embodiments the local RCA mechanisms 105B are mechanisms developed or obtained for performing root cause analysis specific to the network 130B. In some embodiments, the local RCA mechanisms are different from the local RCA mechanisms 105A. In other embodiments, the local RCA mechanisms 105A can include a same or similar subset of mechanisms as RCA mechanisms 105B. As opposed to the example of network 130A, which includes the RCA controller 103A, the network 130B does not include the RCA controller 103B. In this example, the RCA controller 103B may be located in a network that is different from the network 130B. The RCA controller 103B is operative to communicate with the elements of the network 130B through the NEU 102B. In this example, the RCA controller 103B is operative to serve two or more networks, e.g., 130B and 130N. The RCA controller 103B is offered as a service to these networks enabling each of the networks 130B and 130N to share their respective local RCA mechanisms, if any, and access global root cause decision trees generated based on local RCA mechanisms of other networks, e.g., of network 130A.

The policy manager 104 is a network node. The policy manager 104 is operative to create and update policies for data sharing. For example, the policy manager 104 may be used to set geofencing policies and network operator policies. The policy manager 104 can be a network node implemented in a network device that is separate from each one of the networks 103A-N. In some embodiments, the policy manager 104 can be a network node that is owned or operated by a national regulator entity or transnational regulator entity (e.g. European Union's legislative branch). In other embodiments, the policy manager 104 can be part of one of the networks 130A-N and is operated and owned by one of the network operators 106A-N.

The root cause analyzer 150 is a network node that is operative to transmit a request to an RCA controller, e.g., RCA controller 103A or RCA controller 103B, for a root cause analysis. The request includes an input, a network operator identifier, and an expected output to the RCA controller and the controller is operative to return the description of the root cause. The root cause analyzer 150 can be part of any one of the networks 130A, 130B, 130N, or 120. In some embodiments, the root cause analyzer 150 can be an entity owned and operated by the network operator. In other embodiments, the root cause analyzer 150 can be an entity independent of the network operator but authorized to perform root cause analysis for the network operator. For example, the root cause analyzer 150 can be a network node of third-party service. The root cause analyzer 150 can be a baseband network node that is operative to establish, based on a set of alarms, the root cause of these alarms. In some embodiments, each one of the RCA controllers, e.g., RCA controller 103A or RCA controller 103B, exposes an interface for accepting root cause analysis requests. In some embodiments, the interface can be a Representational State Transfer (REST) API. The request includes the symptoms, e.g., the input and the expected output, as well as a network operator identifier. The identifier identifies the network operator that owns or operates the network for which the root cause is to be performed.

Each one of the RCA controllers 130A-B and the policy manager 104 is a node in a distributed ledger network. Each one of the RCA controllers 130A-B, and the policy manager 104 stores a copy of a distributed ledger 110A, 110B, and 110C. The distributed ledger is built based on distributed ledger technology (DLT) systems. These systems are platforms used for building, running, and deploying a decentralized distributed digital ledger. In a DLT system a distributed ledger permanently records digital records of transactions that occur between two parties. The records cannot be altered retroactively without the alteration of all subsequent transactions in the digital ledger and without consensus from other nodes in the network. This allows the participants to verify and audit transactions inexpensively and securely. A distributed ledger is maintained without a central authority or implementation. For example, the distributed ledger can be a blockchain that includes blocks secured and linked to one another using cryptographic mechanisms.

The use of a distributed ledger to record global root cause decision tree allows for immutability (a sequence of entries can be traced back to the beginning of transactions) and consensus (for every new entry, all nodes that are part of the distributed ledger should concede that this entry is legitimate to be added to the distributed ledger). Due to these properties, the advantages of a distributed ledger over allows for an increased data integrity against tampering from malicious users and immutability of the data stored, as well as an increased data quality.

Each copy of the distributed ledger includes entries forming global root cause decision trees 112A, 112B, and 112C. The distributed ledger (or DL) is used to store in a global root cause decision tree update information that provides from local RCA mechanisms, e.g., 105A or 105B. The update information relates to updates issued/proposed by an operator, operator 106A 106B, to a local RCA mechanism stored in one of 105A or 105B. The distributed ledger further includes entries for storing the global policies 116A, 116B, and 116C.

The global policies 116A, 116B, and 116C include two types of policies, a network operator policies and geo fencing policies. FIG. 2C illustrate block diagrams of exemplary tables including network operator policies 230 that can be set for network operators, in accordance with some embodiments. FIG. 2D illustrates a block diagram of an exemplary table including geo fencing policies 240 that can be set for one or more network operators, in accordance with some embodiment. In one non-limiting example, the network operator policies represent information related to multilateral agreements established between multiple network operators for sharing global RCA data. These policies can be used to enforce and provide access to decision modules. For example, the network policies 230 includes three policies: policy 1, policy 2, and policy 3. Each policy identifies for each global decision tree, e.g., global decision tree 1, which network operators can access it. For example, global decision tree 1 can be accessed by network operators with IDs {289 88, 544 11, 213 03}. The IDs uniquely identify the network operator. The IDs can be mobile country code, MCC, and mobile network code, MNC. The geofencing policies 240 define which operators can share RCA data based on geographical location and geographical based treaties and agreements (e.g., agreements between countries, international treaties, etc.). Geofencing policies 240 define a first policy with ID 1, a second policy with ID 2, and a third policy ID 3. In this example, the policies use mobile country code, MCC, notation. Policy 1 allows sharing of data between Greek, Swedish, UK operators, policy 2 between Canadian and US operators and policy 3 between Afghani, Azerbaijani, Bangladeshi and Bahraini operators. Typically, such policies have override policy over multilateral agreements for data sharing between operators. For example, if policy 230 and 240 are used in conjunction, then global tree 1 and global tree2 could not be shared as there is either no policy or they violate existing policies.

As it will be discussed in further details below, the RCA controllers 103A and 1030B enable the storage of one or multiple global root cause analysis decision trees that can be shared by multiple network operators and enable to perform root cause analysis on the multiple networks that are owned and managed by these operators. The RCA controllers 130A and 130B allows the translation of local RCA mechanisms into global root cause decision trees that are recorded in an immutable manner in a distributed digital ledger.

The embodiments presented herein allow multiple network operators, such as network operators 106A-B, to have access to the same root cause analysis decision trees, e.g., a global root cause analysis tree from 112A or 112B. This enables the network operators 106A and 106B to consider similarities in root causes of problems across multiple networks and helps to find the best course of remedial action for predicted events for all the networks. Thus, an authorized network operator can be given access to a new type of root cause analysis decision mechanism from another network operator through the shared distributed ledger storing these mechanisms without requiring the network operator to store or generate an equivalent RCA mechanism in its own local infrastructure. The present embodiments allow a secure sharing of root cause decision trees without disclosure of confidential information to non-authorized operators and without access to sensitive data. In addition, the present solution is generic and can be applied for performing root cause analysis at multiple levels, e.g., for radio site alarms, transport/backhaul, core network, or any other types of problem analysis and detection in a network. In some embodiments, the solution is implemented based on standardized service exposure functions for exposing local information updates from the networks to the RCA controllers.

Update of a Root Cause Analysis Mechanism and/or Sharing Policy

Figure 3A:
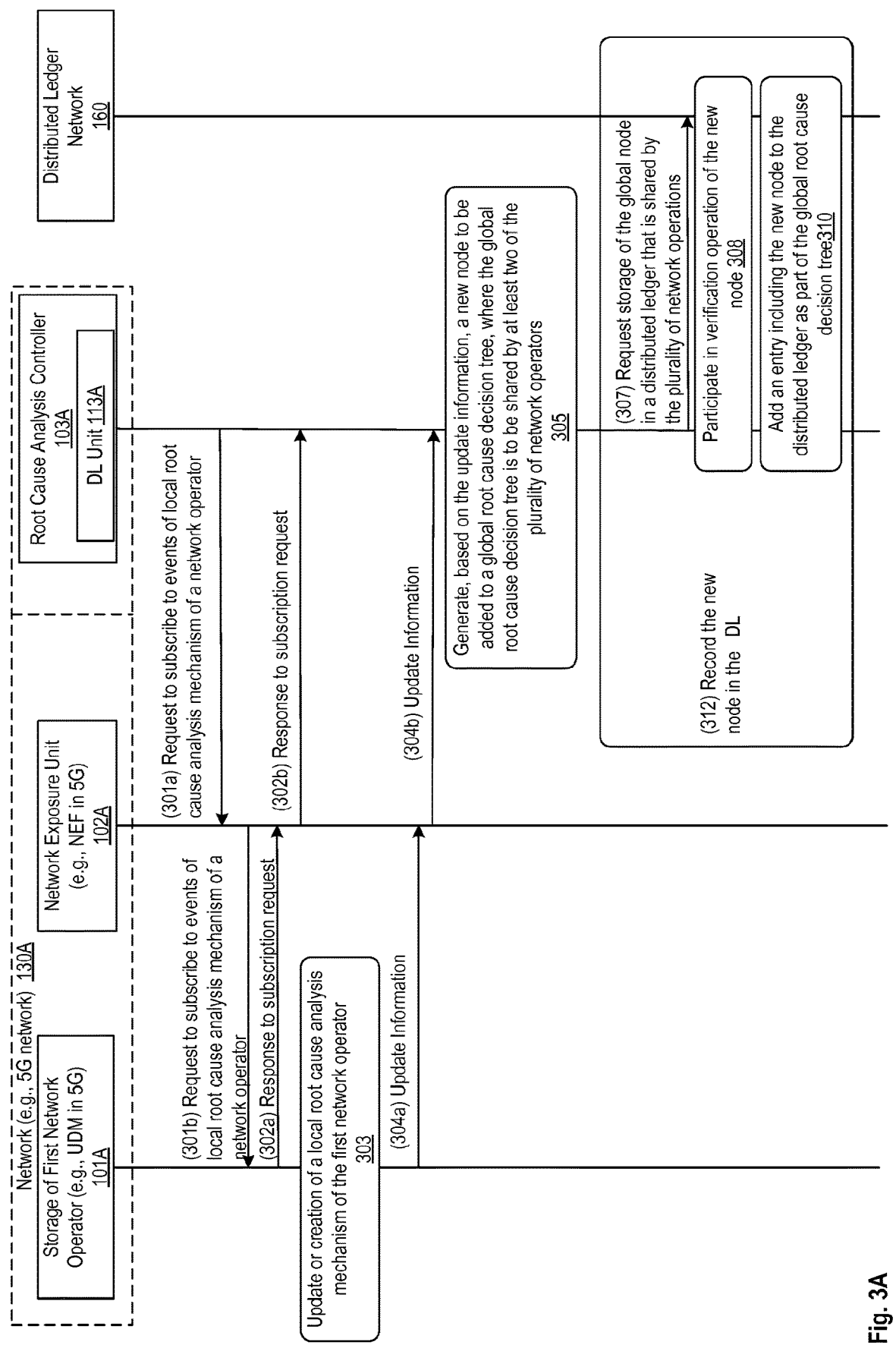
FIG. 3A illustrates a block diagram of exemplary transactions that can be performed in a system for enabling root cause analysis across multiple network systems, in accordance with some embodiments.

FIG. 3A illustrates a block diagram of exemplary transactions that can be performed in a system for enabling root cause analysis across multiple network systems, in accordance with some embodiments. The embodiments described herein will be described with reference to the network operator 106A and the RCA controller 103A of the network 130A. However, one of ordinary skill in the art would understand that this is intended to be exemplary only and the operations below can be performed for any network and RCA controller that serves one or more network operators. For example, the operations described herein can be performed by the RCA controller 103B and the one or more of the networks 103B and 103N.

At operation 301a, the RCA controller 103A transmits a request to subscribe to events of local root cause analysis mechanisms. The request is received at the NEU 102A, which transmits, at operation 301b, the request to the storage 101A. Upon receipt of the request, the storage 101A subscribes the RCA controller 103A for receiving events related to one or more root cause mechanisms stored in the storage 101A. In some embodiments, upon receiving the request, the storage 101 may subscribe the RCA controller 103A to receive all updates for any local root cause analysis mechanism that is stored in the storage. Alternatively, the request may include an identifier of the local root cause analysis mechanism and the storage may subscribe the RCA controller 103A to receive updates for the local root cause analysis mechanism that the identifier identifies. Upon subscribing the RCA controller 103A to receive updates, the first storage 101A transmits, at operation 302a, a response confirming the subscription. Upon receipt of the response from the storage 101A, the NEU 102A transmits the response, at operation 302b, to the RCA controller 103A.

At operation 303, an update of creation of a local root cause analysis mechanism occurs in the storage 101A. In some embodiments, a new local root cause analysis mechanism is added to the storage 101A for the network 106A. In other embodiments, an update to a local root cause analysis mechanism already stored in storage 101A occurs. Upon the update or creation of the local root cause analysis mechanism, an update information is transmitted to the NEU 102A at operation 304a. At operation 304a, the NEU 102A transmits the update information to the RCA controller 103A.

The RCA controller 103A receives the update information of a first local root cause analysis mechanism 105A of the first network operator 106A. The update information includes input data format, output data format, decision module information, and an identifier of the first network operator. The update information can further include a branching condition, an identifier of the network operator 106A, and an identifier of the local root cause analysis mechanism stored in 105A. For example, when the local root cause analysis mechanism is a local decision tree, the information data can include an identifier of the local decision tree.

At operation 305, the RCA controller 103A generates, based on the update information, a new node to be added to a global root cause decision tree. The global root cause decision tree is to be shared by at least two of the multiple network operators, e.g., network operator 106A and network operator 106B.

A decision tree is a flowchart-like structure in which each internal node represents a test/decision on an attribute, each branch represents the outcome of the test, and each leaf node represents a class label (decision taken after computing all attributes). A path from a root to a leaf of the decision tree represents one or more classification rules. Thus the local root cause analysis mechanisms are translated into a global decision tree that is to be stored in the distributed ledger. A node of the global decision tree is an entry in the DL and is generated based on the update information received.

There exist three basic nodes in a global root cause decision tree:

One root node. The root node is the initial node in the decision tree.

One or more decision nodes (which are also referred to as intermediate nodes herein). A decision node is an intermediate node between a root node and another intermediate node, between an intermediate node and a root cause node, or between a root node and a root cause node, which indicates a decision to be made. The decision can be as simple as if-then rules, or can also be more complex, e.g., a trained prediction model (e.g. using regression, classification, clustering etc.). Based on a given input, a decision node produces an output and may branch out to more than one outcomes. For example, given as input a temperature value, one branch could indicate "critical temperature" and another "normal temperature".

One or more root cause nodes (which are also referred to as end nodes or terminal cause nodes herein). A root cause node indicates the outcome of a root cause analysis process. The value of the outcome is typically a response to a root cause analysis request and indicates the root cause.

There are two types of decision trees, classification and regression. A classification type decision tree relates to cases where the response variable is categorical in nature (e.g. a qualitative value such as "good" or "bad"). Decision trees of regression type are used when the response variable is numeric/continuous. Generally, decision trees of classification type are used for performing RCA, however, other regression/classification trees can be also included in the root cause trees (e.g., in the decision nodes of the tree).

Based on the update information, the new node is generated as part of a global root cause decision tree. The new node includes a type of node, an identifier of the new node, an identifier of a parent node in the global root cause decision tree, input data format, output data format, decision module information, and an identifier of the first network operator. The new node is determined at least in part based on the update information received from the NEU 102A. For example, the input data format and the output data format are respectively determined based on the input and the output included in the update information. The new node includes the update information and one or more additional parameters that are generated by the RCA controller 103A for the new node. For example, the additional parameter can include a type of the new node. A type of the new node generated at operation 305, can be anyone of a root node, a decision node, or a root cause node. The additional parameter can further include an identifier of the decision tree to which the node belongs. The additional parameter may include a node identifier that uniquely identifies the node in the global decision tree. Depending on the embodiment, the new node can also include a bias and a conversion parameter.

Once the new node is generated, the RCA Controller 103A records the new node in the distributed ledger, at operation 312. The recordation of the new node in the distributed ledger includes the operations 307, 308, and 310. At operation 307, the RCA controller 103A requests storage of the new node in the distributed ledger that is shared by the network operators. At operation 308, the RCA controller 103A participates in a verification operation of the new node. Responsive to determining that the verification operation is successful, the RCA controller 103A adds, at operation 310, an entry including the new node to the distributed ledger as part of the global root cause decision tree.

Figure 10A:
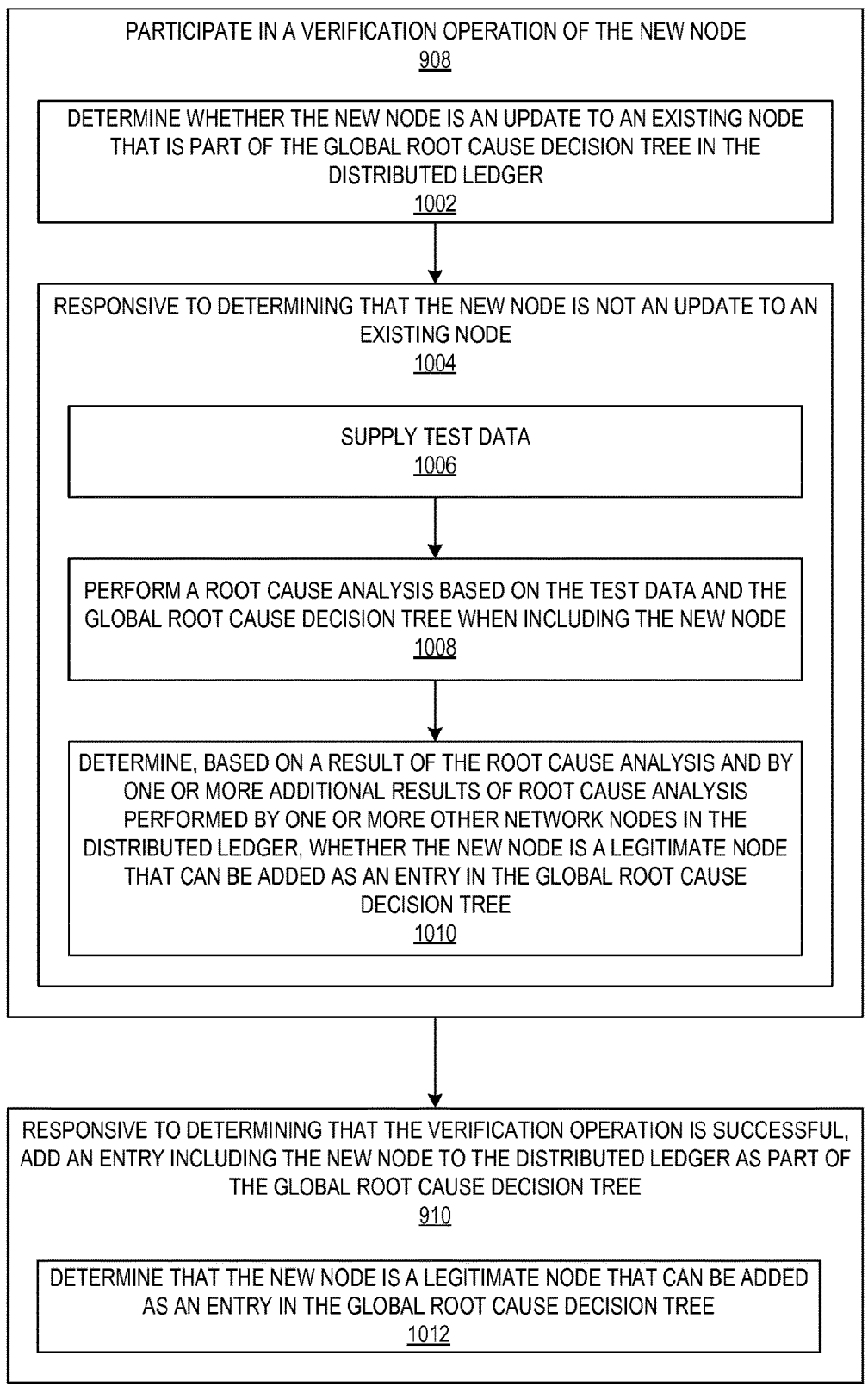
FIG. 10A illustrates a flow diagram of exemplary operations for participating in a verification operation of a new node, in accordance with some embodiments.
Figure 10B:
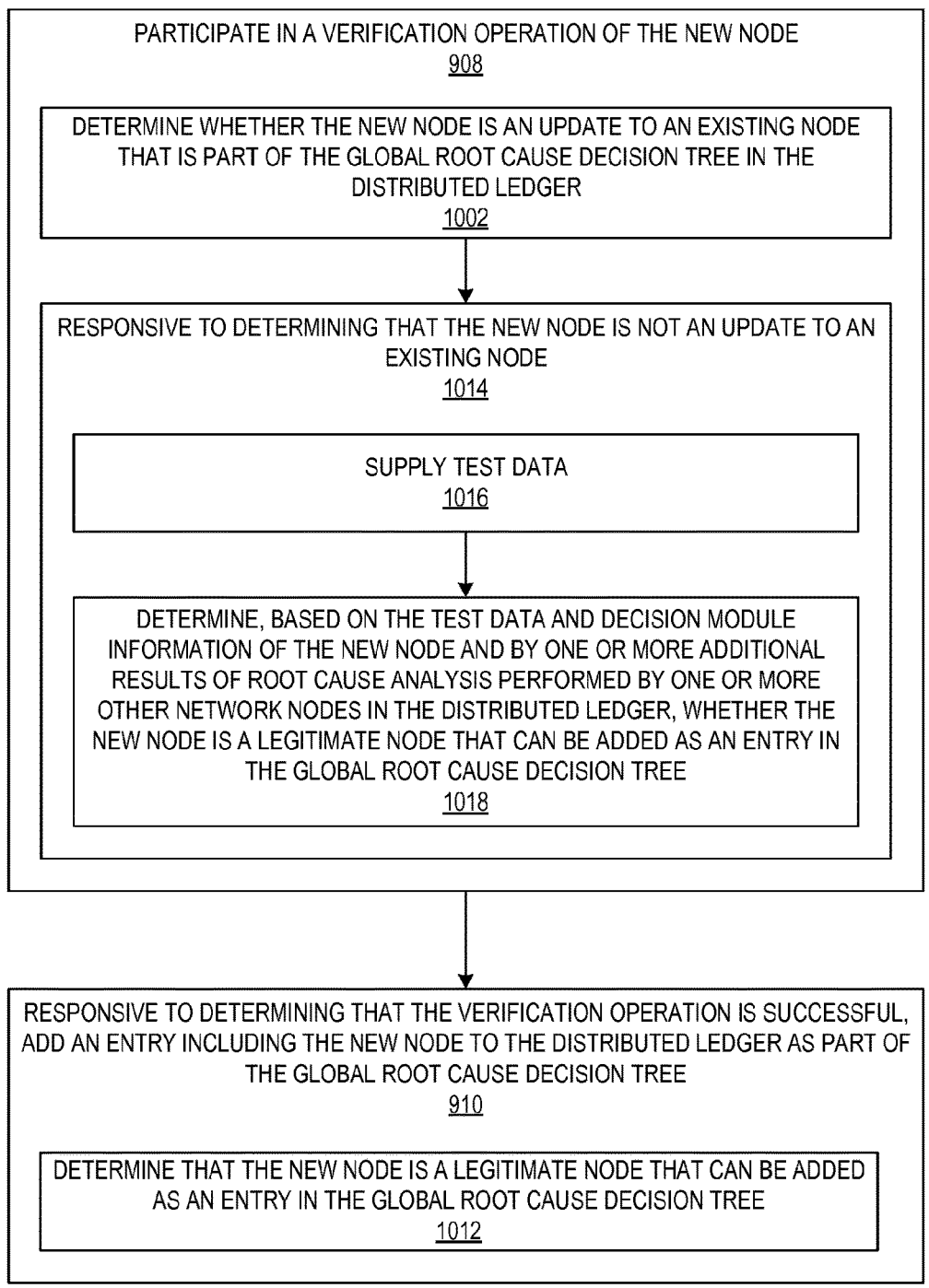
FIG. 10B illustrates a flow diagram of exemplary operations for participating in a verification operation of a new node, in accordance with some embodiments.
Figure 10C:
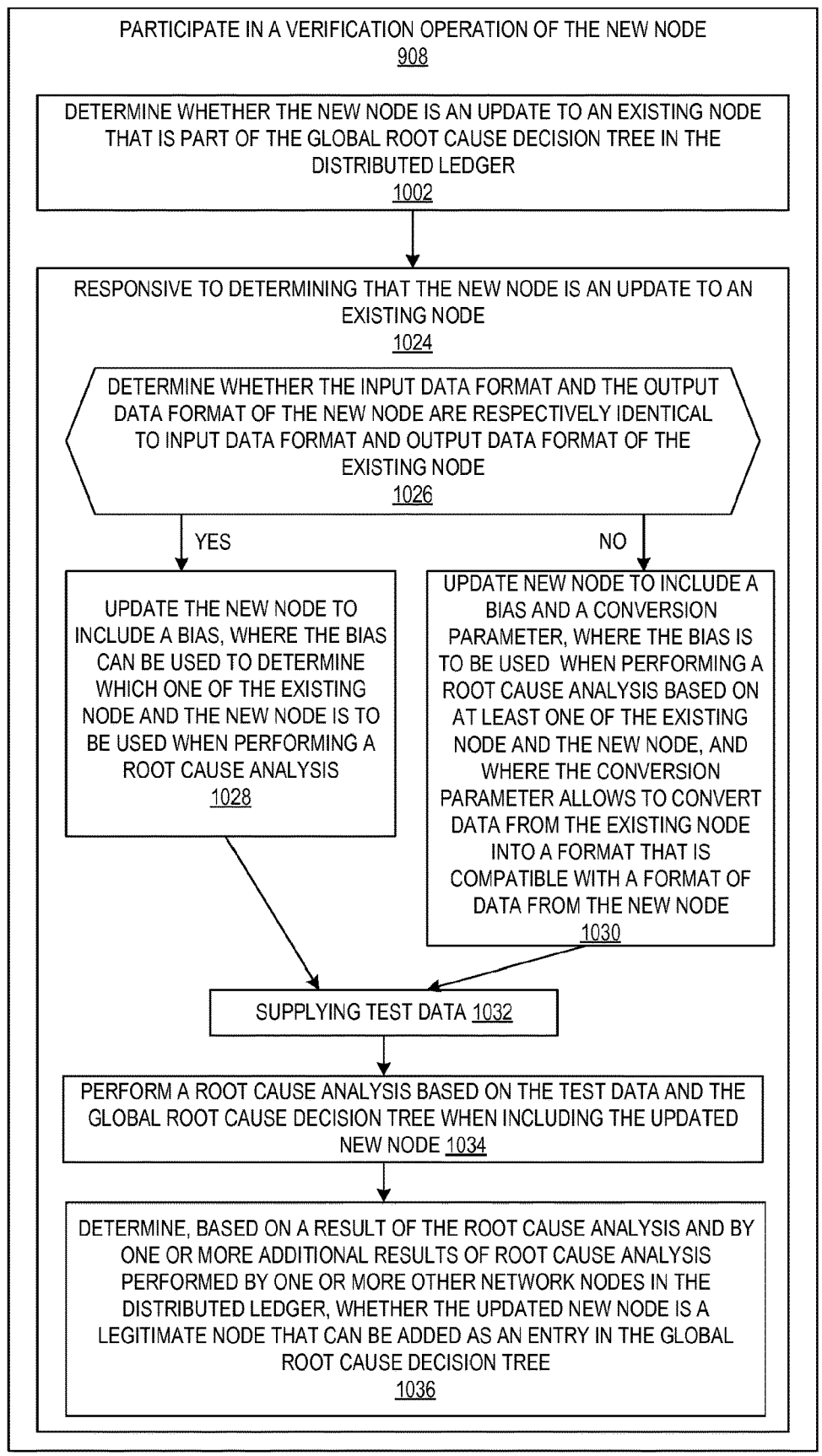
FIG. 10C illustrates a flow diagram of exemplary operations for participating in a verification operation of a new node, in accordance with some embodiments.

The verification operation can be performed through one of several embodiments by the RCA controller 103A depending on whether or not the node to be added to the global decision tree is an update to an existing node or not. FIG. 10A-C illustrates flow diagrams of exemplary operations for participating in a verification operation of a new node, in accordance multiple embodiments.

Figure 3B:
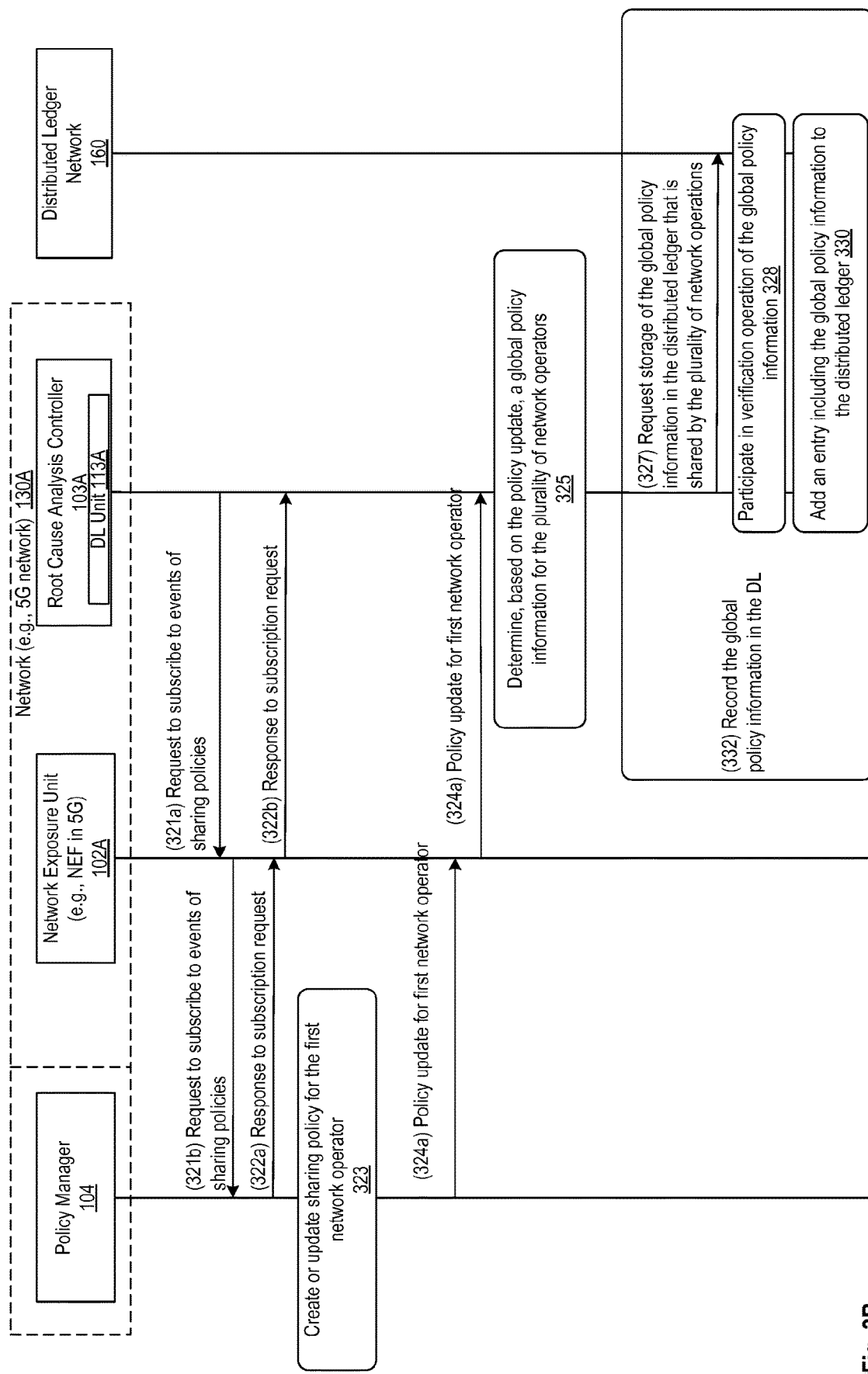
FIG. 3B illustrates a block diagram of exemplary transactions that can be performed in a system for updating a policy for one or more network operators, in accordance with some embodiments.

FIG. 3B illustrates a block diagram of exemplary transactions that can be performed in a system for updating a policy for one or more network operators, in accordance with some embodiments. The embodiments described herein will be described with reference to the network operator 106A, the RCA controller 103A of the network 130A, and the policy manager 104. However, one of ordinary skill in the art would understand that this is intended to be exemplary only and the operations below can be performed for any network and RCA controller that serves one or more network operators. For example, the operations described herein can be performed by the RCA controller 103B and the one or more of the networks 103B and 103N. In some embodiments, the policy manager 104 can be part of the network 130A. In other embodiments, the policy manager 104 can be separate from the network 130A.

At operation 321a, the RCA controller 103A transmits a request to subscribe to events of sharing policies for the network 130A. The sharing policies can be network operator policies and/or geofencing policies. The request is received at the NEU 102A, which transmits, at operation 321b, the request to the storage 101A. Upon receipt of the request, the storage 101A subscribes the RCA for receiving events related to sharing policies 107A. In some embodiments, upon receiving the request, the storage 101A may subscribe the RCA controller 103A to receive all updates for sharing policies stored in the local storage 101A. Upon subscribing the RCA controller 103A to receive updates, the first storage 101A transmits, at operation 322a, a response confirming the subscription. Upon receipt of the response from the storage 101A, the NEU 102A transmits the response, at operation 302b, to the RCA controller 103A.

At operation 323, an update or creation of a new sharing policy occurs in the storage 101A. In some embodiments, a new sharing, e.g., a new geofencing policy or a new network operator policy, is added to the storage 101A for the network 106A. In other embodiments, an update to an existing sharing policy stored in storage 101A occurs. Upon the update or creation of the sharing policy, a policy update is transmitted to the NEU 102A at operation 324a. At operation 324a, the NEU 102A transmits the policy update to the RCA controller 103A.

At operation 325, the RCA controller 103A generates, based on the policy update, a global policy information for the multiple operators that share RCA mechanisms in the DL. Once the global policy information is generated, the RCA Controller 103A records the global policy information in a distributed ledger, at operation 332. In some embodiments, the distributed ledger can be the same distributed ledger as the one of distributed ledger 160 in which the global decision trees are recorded. In other embodiments, a different distributed ledger of a different distributed ledger network (not illustrated) can be used to store the policies. The recordation of the global policy in the distributed ledger includes the operations 327, 328, and 330. At operation 327, the RCA controller 103A requests storage of the global policy in the distributed ledger that is shared by the network operators. At operation 328, the RCA controller 103A participates in a verification operation of the global policy. The verification operation is based on a consensus mechanism that is performed by multiple network nodes of the distributed ledger network. Responsive to determining that the verification operation is successful, the RCA controller 103A adds, at operation 330, an entry including the global policy to the distributed ledger as part of the global root cause decision tree.

Exemplary New Node to be Added to a Global Root Cause Decision Tree

In some embodiments, the DL is a blockchain and the nodes of a global root cause decision trees are added as blocks in the blockchain. While in the FIGS. 4, 6, and 7, the nodes of the global root cause decision trees are recorded as blocks in a blockchain, in other embodiments, the nodes can be stored based on another structure in a different type of distributed ledger network. For example, smart-contract based DLTs can be used to record the nodes of the global decision tree.

Figure 4:
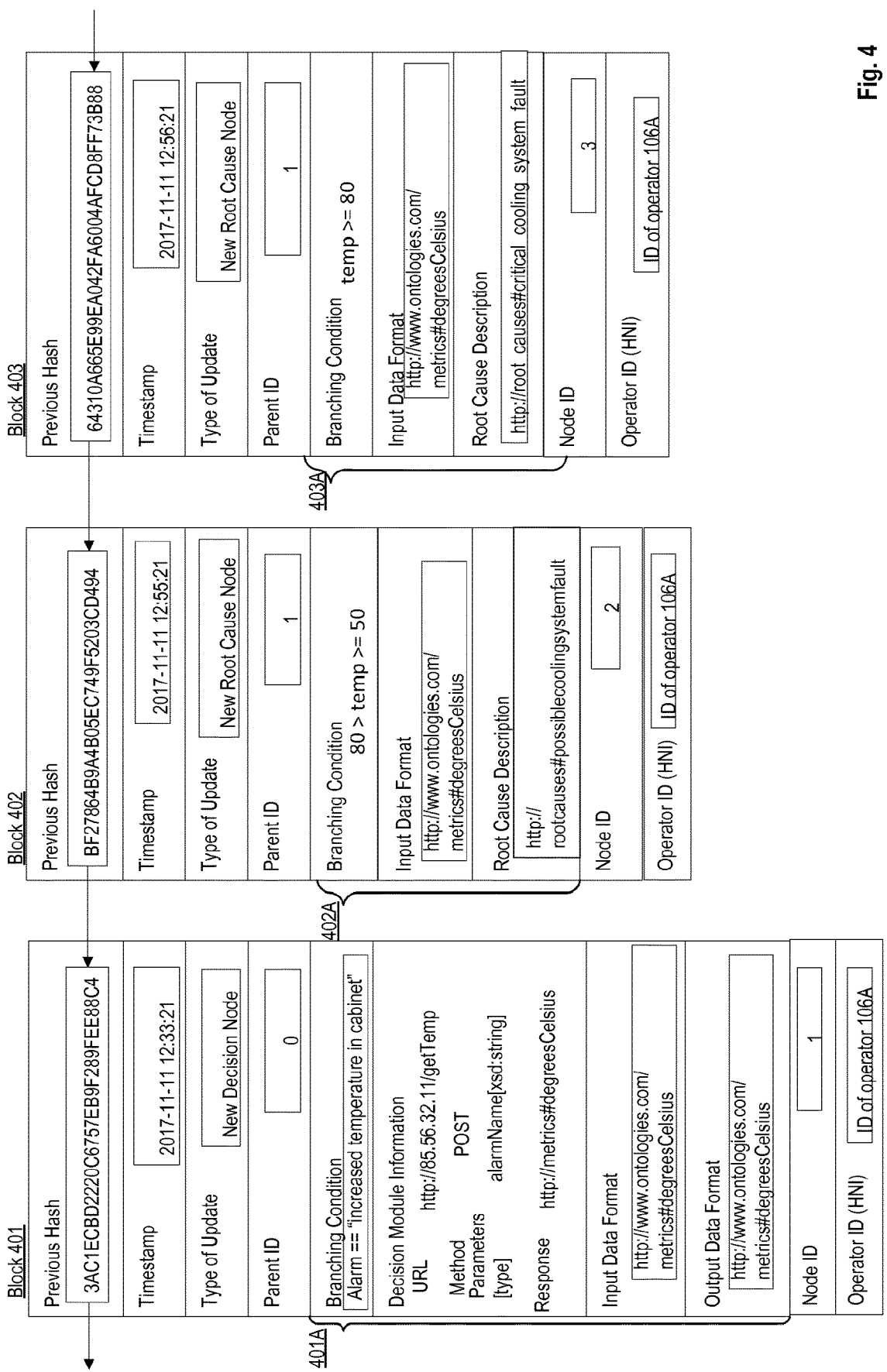
FIG. 4 illustrates a block diagram for multiple entries representing a root cause decision tree in a distributed ledger, in accordance with some embodiments.
Figure 5:
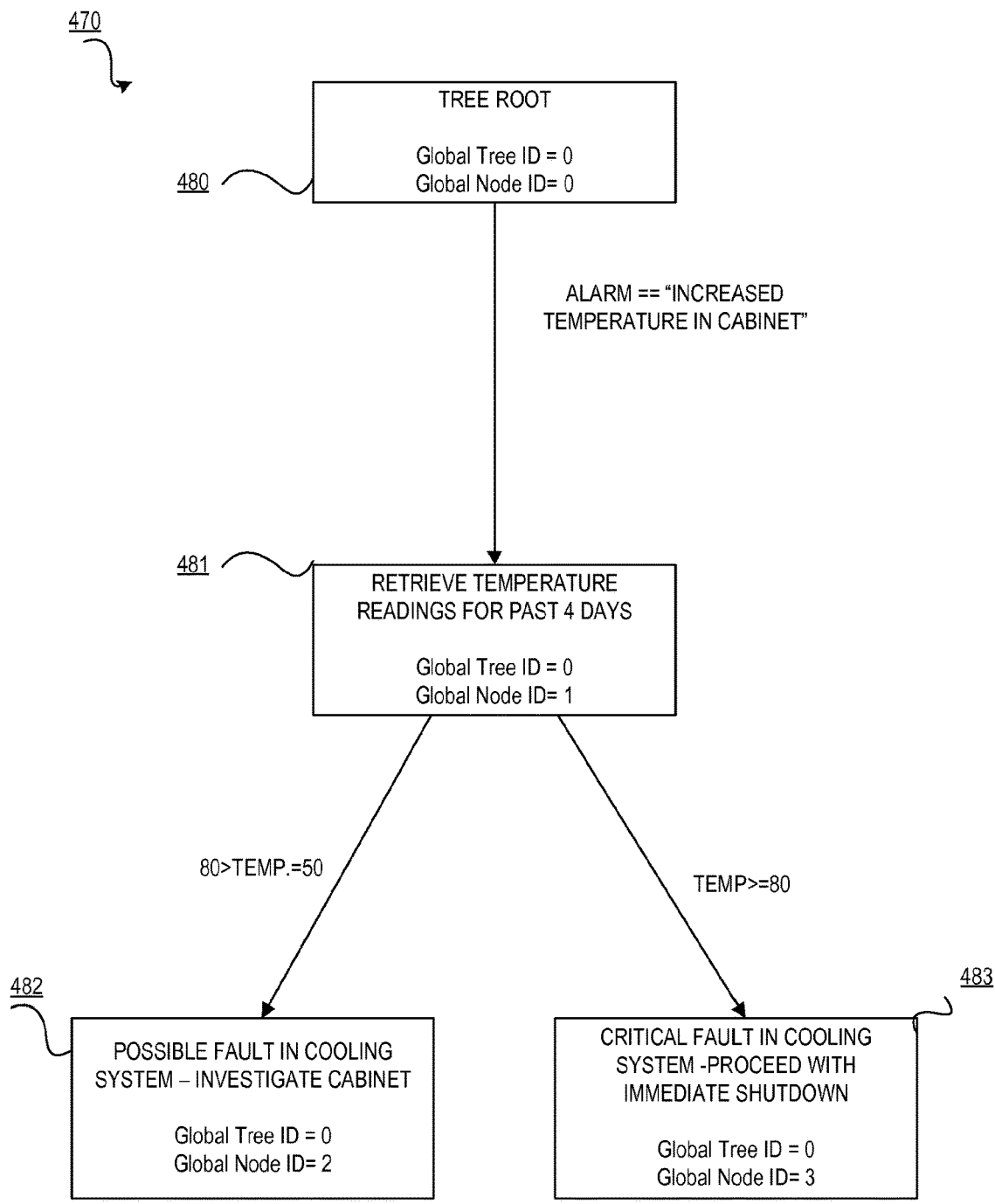
FIG. 5 illustrates a block diagram of an exemplary global decision tree that can be stored in a distributed ledger in accordance with some embodiments.

FIG. 4 illustrates a block diagram for multiple entries representing a root cause decision tree in a distributed ledger, in accordance with some embodiments. In the illustrated example of FIG. 4, each one of the blocks 401, 402, and 403 represents a node of a global root cause decision tree 470 illustrated in FIG. 5. The block 401 represents a decision node 481, the block 402 represents the root cause node 882, and the block 402 represents the root cause node 883. Each one of the blocks includes a set of parameter values that are determined from the information update received from a local RCA storage system, e.g., the set of values 401A, 402A, or 403A. The set of parameter values 401A includes a branching condition, a decision module information, an input data format, an output data format. The set of parameter values 402A includes a branching condition, an input data format, an output data format, and a root cause description. The set of parameter values 403A includes a branching condition, an input data format, an output data format, and a root cause description. Each one of the blocks 401, 402, and 403 further includes additional parameter values that are determined by the RCA controller 103A when generating the new node of the global decision tree to be added to the DL. These additional parameter values include a type of update, a parent identifier which uniquely identifies parent node of the current node in the decision tree, a node identifier (node ID), and an identifier of the network operator from which the global decision tree result. The network operator identifier can identify the first network operator that generated a corresponding local root cause mechanism that resulted in the global decision tree. Each one of the blocks further includes a timestamp, which records the time of the update, a hash, which is part of the blockchain structure and includes a pointer to the previous block.

When an RCA controller 103A receives update information, it generates a node of a global decision tree based on the update information and determines as described with reference to the flow diagrams and the operations of FIG. 3A whether to add the new node in the DL. Upon determining that the node does not have a corresponding existing node in the DL, the RCA controller 103A records the new node in the digital ledger. The recordation of the digital ledger results in a new entry in the DL, for example, in a new block in the blockchain of FIG. 4.

Figure 6:
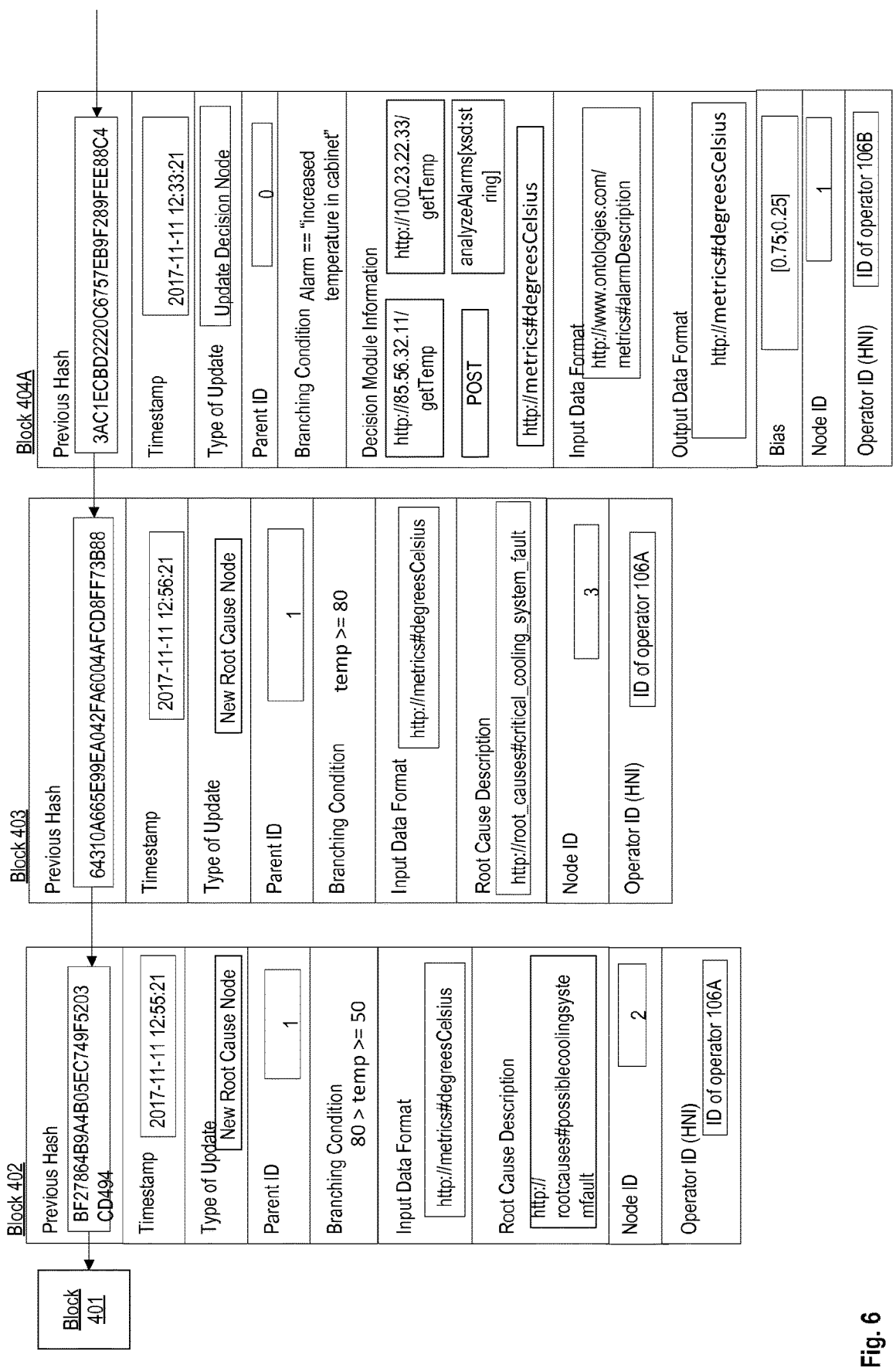
FIG. 6 illustrates a block diagram for adding entry in a distributed ledger when there is an existing entry, in accordance with some embodiments.

FIG. 6 illustrates a block diagram for adding an entry in a distributed ledger when there is an existing entry, in accordance with some embodiments. Upon receipt of update information, the RCA controller 103A determines whether the new node is an update to an existing node that is part of the global root cause decision tree in the distributed ledger. Responsive to determining that the new node is an update to an existing global node, the RCA controller 103A performs a set of operations to determine whether to add the entry to the DL and how. For example, upon receipt of a node that is an update to the node stored in block 401, the RCA controller 103A may determine to add the new node as block 404. The RCA controller 103A updates the new node to include a bias. The bias is used to determine which one of the existing global node and the new node is to be used when performing a root cause analysis. The blocks includes a first and a second decision module information. The first decision module information directs towards the decision module included in the block 402 and the second decision module information directs towards the decision module obtained in the second update information. For example, the first decision module can be obtained from a first network operator 106A, and the second decision module can be obtained from the second network operator 106B. The block 404 includes a bias parameter, which is used to determine, which decision module or how a node of the global root cause decision tree can be retrieved based on at least one of the decision module information.

Several embodiments can be used for determining the bias for performing the root cause analysis. For example, the bias can be calculated based on the tests performed during the verification operation of the node. If the node collectively outperforms existing decision nodes in the decision tree, i.e., results can be drawn using information from all controllers, then the node is assigned a larger bias and vice versa.

In another embodiment, the bias can be hardcoded in each one of the RCA controllers. In this embodiment, a preference can be given to some operators over others. For instance, a tier-1 network operator with many subscribers may have higher weight than a tier-3 mobile virtual network operator (MVNO). The weight values can be agreed a-priori by the network operators then hardcoded in each of the RCA controllers of the distributed ledger network. Instead of a preferential system, in another embodiment, a fairness approach can be used to select the decision tree. In a third embodiment, the weight values for the bias can be determined based on a learning process performed at the RCA controller over time. The RCA controllers may learn about which of the decisions made the most impact using reinforcement learning and may adapt the weight values accordingly.

While the illustrated example, shows that the new node to be added is a decision node and the conflict between the existing node and the new node reside in the decision module information, in other embodiments, the new node is an updated to a root cause node and the conflict may reside in the root cause description as opposed to the decision module information. In this embodiment, the bias can be used to determine, which one of the root cause node is to be used or how to determine a root cause node based on two root cause nodes and the weight assigned to each one.

Figure 7:
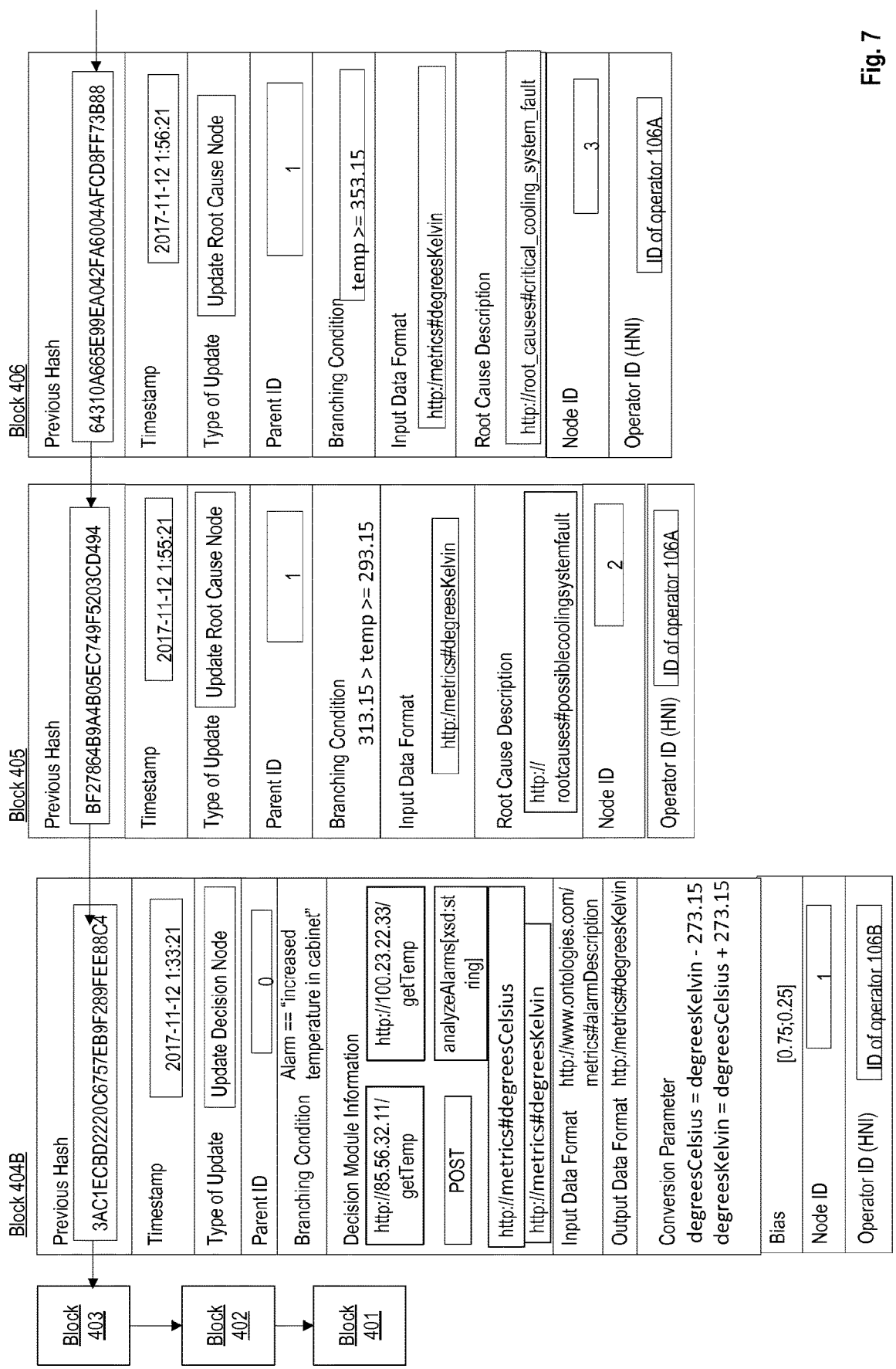
FIG. 7 illustrates a block diagram for adding entry in a distributed ledger when there is an existing similar entry, in accordance with some embodiments.

FIG. 6 illustrates a block diagram for adding entry in a distributed ledger when there is an existing similar entry, in accordance with some embodiments. The embodiments described with reference to FIG. 6 can be an example of a scenario, in which a second operator, e.g., network operator 106B, has another root cause analysis mechanisms for the same type of problem in a network. For example, the root cause analysis mechanism can be based on evaluation of temperatures in another format (e.g. Kelvin instead of Celsius). In this case, the new decision node is determined to be similar to an existing decision node in the global root cause analysis and is updated with a conversion formula, and the bias discussed in the previous example of FIG. 6. FIG. 7 illustrates blocks 404B, 405, and 406, which are added to the blockchain following the blocks 401, 402, and 403 of FIG. 4. While blocks 401, 402, and 403 are not shown in FIG. 6, one of ordinary skill in the art would understand that this is done in the intent of simplifying the figure and showing the new elements added to the blockchain in response to an update from the second network operator including similar but not identical nodes that the existing decision node. In this example, a conversion parameter is added to the block 404B in addition to the bias parameter, in contrast to block 404A that included only the bias parameter. The RCA controller 103A may have knowledge of the conversion formula or it can ask a third-party service to perform the conversion. In some embodiments, instead of adding the conversion formula in the block, a hyperlink or address of a network resource can be stored in the conversion parameter to indicate the location of a conversion service or a conversion mechanism for converting the input/output of the existing node into the input/output format of the new node, or vice-versa.

The examples of FIGS. 4-7 illustrate non-limiting exemplary scenarios for adding an entry to a DL for a new node of a global decision tree. Several embodiments can be contemplated without departing from the scope of the present embodiments for adding a new node to the decision tree. The new node is added following the evaluation of the existing nodes in the global root cause decision tree. Other mechanisms not described herein can be used for adding a new node. For example, a new node can result in adding a new branch to the decision tree. The new node can also result in adding a new decision tree, for example, when no conversion is possible between a similar existing node and the new node.

Root Cause Analysis Based on Global Root Cause Decision Tree

Figure 8A:
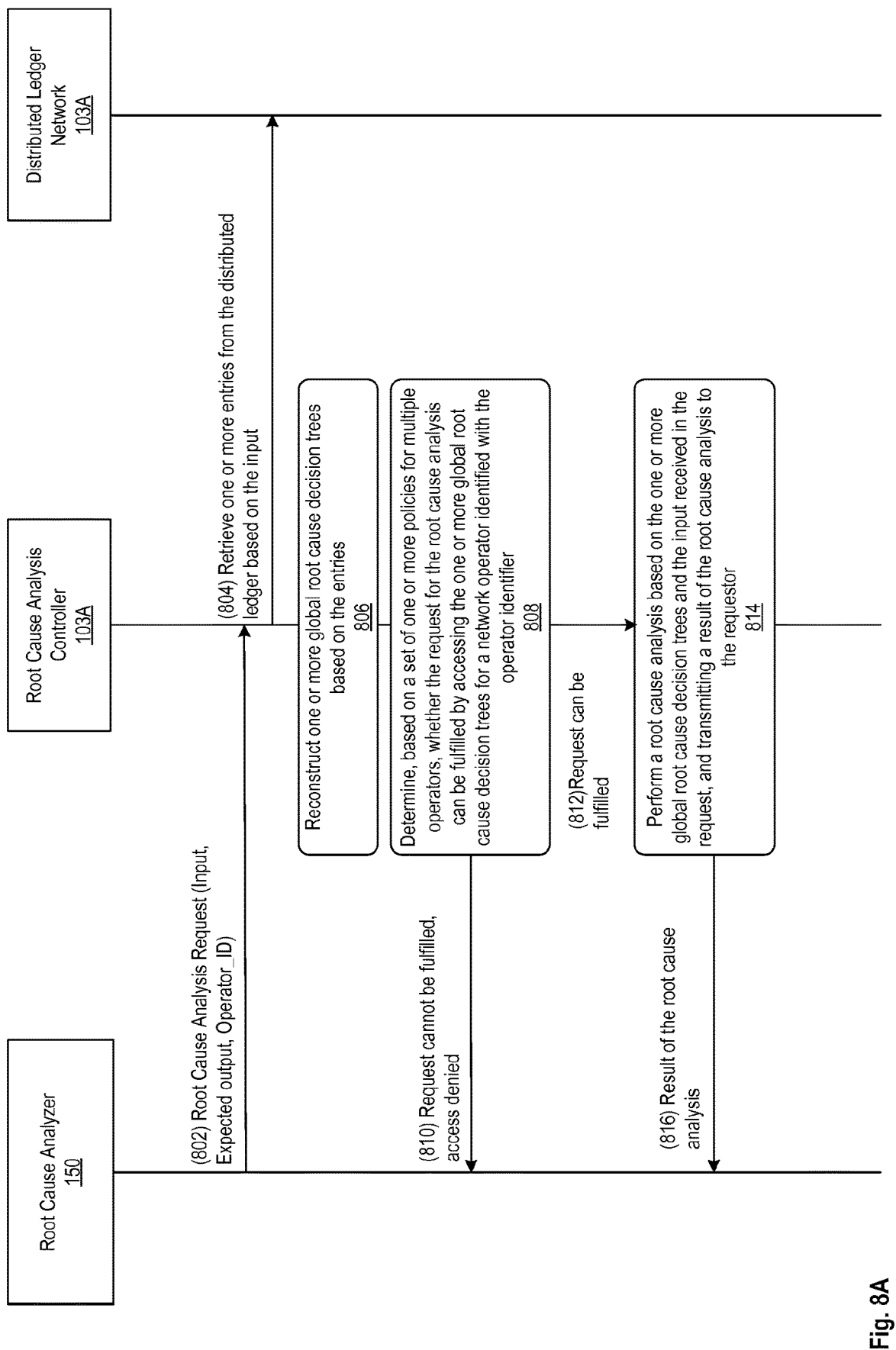
FIG. 8A illustrates a block diagram of exemplary transactions for requesting a root cause analysis based on a global root cause analysis tree stored in a distributed ledger network, in accordance with some embodiment.

Once the RCA controllers have populated the distributed ledger with one or more global root cause analysis, the distributed ledger can be queried to perform root cause analysis for a network. FIG. 8A illustrates a block diagram of exemplary transactions for requesting a root cause analysis based on a global root cause analysis tree stored in a distributed ledger network, in accordance with some embodiment. While the embodiments, below are described with reference to RCA controller 103A, any other RCA controller in the system is operative to receive requests for performing root cause analysis.

A root cause analyzer 150 transmits a request to an RCA controller, e.g., 103A. At operation 1102, the RCA controller 103A receives from the requestor (the root cause analyzer 150), a request for the root cause analysis, where the request includes a network operator identifier, an input, and an expected output. In some embodiments, the root cause analyzer 150 can be an entity owned and operated by the network operator. In other embodiments, the root cause analyzer 150 can be an entity independent of the network operator but authorized to perform root cause analysis for the network operator. For example, the root cause analyzer 150 can be a network node of third-party service. The root cause analyzer 150 can be a baseband network node that is operative to establish, based on a set of alarms, the root cause of these alarms. The RCA controller 103A exposes an interface for accepting root cause analysis requests. In some embodiments, the interface can be a REST API. The request includes the symptoms, e.g., the input and the expected output, as well as a network operator identifier. The identifier identifies the network operator that owns or operates the network for which the root cause is to be performed.

The RCA controller 103A retrieves, at operation 1104, based on the input and the expected output, one or more entries from the distributed ledger. For example, upon receipt of a request for a root cause analysis, the RCA controller 103A can retrieve the three blocks of FIG. 4 that correspond to a global root cause decision tree. The selection of the entries can be done using a combination of symptoms (i.e. input to tree) and expected output.

The flow moves to operation 806, at which the RCA controller 103A reconstructs one or more global root cause decision trees from the entries. For example, the RCA controller 103A can reconstruct the tree illustrated in FIG. 2B.

At operation 808, the RCA controller 103A determines, based on a set of one or more policies for multiple operators, whether the request for the root cause analysis can be fulfilled by accessing the one or more global root cause decision trees for a network operator identified with the operator identifier. The policy check can be performed in two-stage. In a first stage, for the given selected tree, the identifier of each network operator that is allowed to access the decision tree is extracted. In some embodiments, the Home Network Identifier (HNI) of all participating network operators is extracted, then the MCC is determined from the HNI. The RCA controller 103A determines whether the identifier of the network operators that are allowed to access the decision tree and the identifier of the network operator included in the request all belong in the same geofencing policy. If it is determined that the identifier of the network operator belongs to the same geofencing policy as the identifiers of the network operators allowed to access the decision tree, the RCA controller 103A proceeds to checking multilateral agreements, otherwise it returns an access denied response to the requestor 150.

In a second stage, a determination is performed based on the identifier of the network operator included in the request and the tree IDs are checked against the network operator policies that are stored in a distributed ledger. If for the given decision tree, the identifier of the network operator is included in the set identifiers of network operators that are allowed to access the decision tree, then policy control is complete, operation 812, and the RCA controller 103A can proceed to the next operation 814.

Responsive to determining that the request can be fulfilled, the RCA controller 103A performs, at operation 814, a root cause analysis based on the global root cause decision trees and the input received in the request, and transmits, at operation 816, a result of the root cause analysis to the requestor 150. In some embodiments, the RCA controller 103A may retrieve a single decision tree for the request from the distributed ledger. In these embodiments, the root cause analysis is performed based on this single decision tree. In other embodiments, the RCA controller 103A can retrieve more than one decision tree for the request. For example, two trees can be retrieved. As illustrated in FIG. 6, multiple nodes of different trees can be stored in the distributed ledger, for example, some nodes may include a bias that can be used to determine how to perform the root cause analysis. In these embodiments, the root cause analysis is performed by taking into consideration the bias associated for the nodes.

In one embodiment, the bias indicates a weight associated for a particular parameter of a node in the tree. For example, the weight can be associated with the decision module information of anode. In the example of FIG. 6, a weight is associated with each possible decision module included in the decision module information, such that a single one of the decision modules can be selected over the other one based on this weight.

While in some embodiments, the bias is used as a zero-sum choice, causing only a single one of the nodes to be selected based on the weight (e.g., the node with the highest weight), in other embodiments, the weights can be used to determine an average output value. In a non-limiting example, the bias is selected such that a first decision node has a 0.6 weight and a second decision node has a weight of 0.4 indicating that the output of first decision node will be taken into account 60% and output of the second 40%. In one example, if the first node outputs 40 degrees Celsius and the second node outputs 30 degrees Celsius, an RCA controller can determine an average output value based on the weights assigned for each one, for example, the average output is determined based on the weights: ((0.6*40)+ (0.4*30))=36 degrees Celsius.

Responsive to determining that the request cannot be fulfilled (e.g., either based on the geofencing policies or the network operator policies), the RCA controller 103A transmits, operation 810, a denied access response to the requestor 150.

Figure 8B:
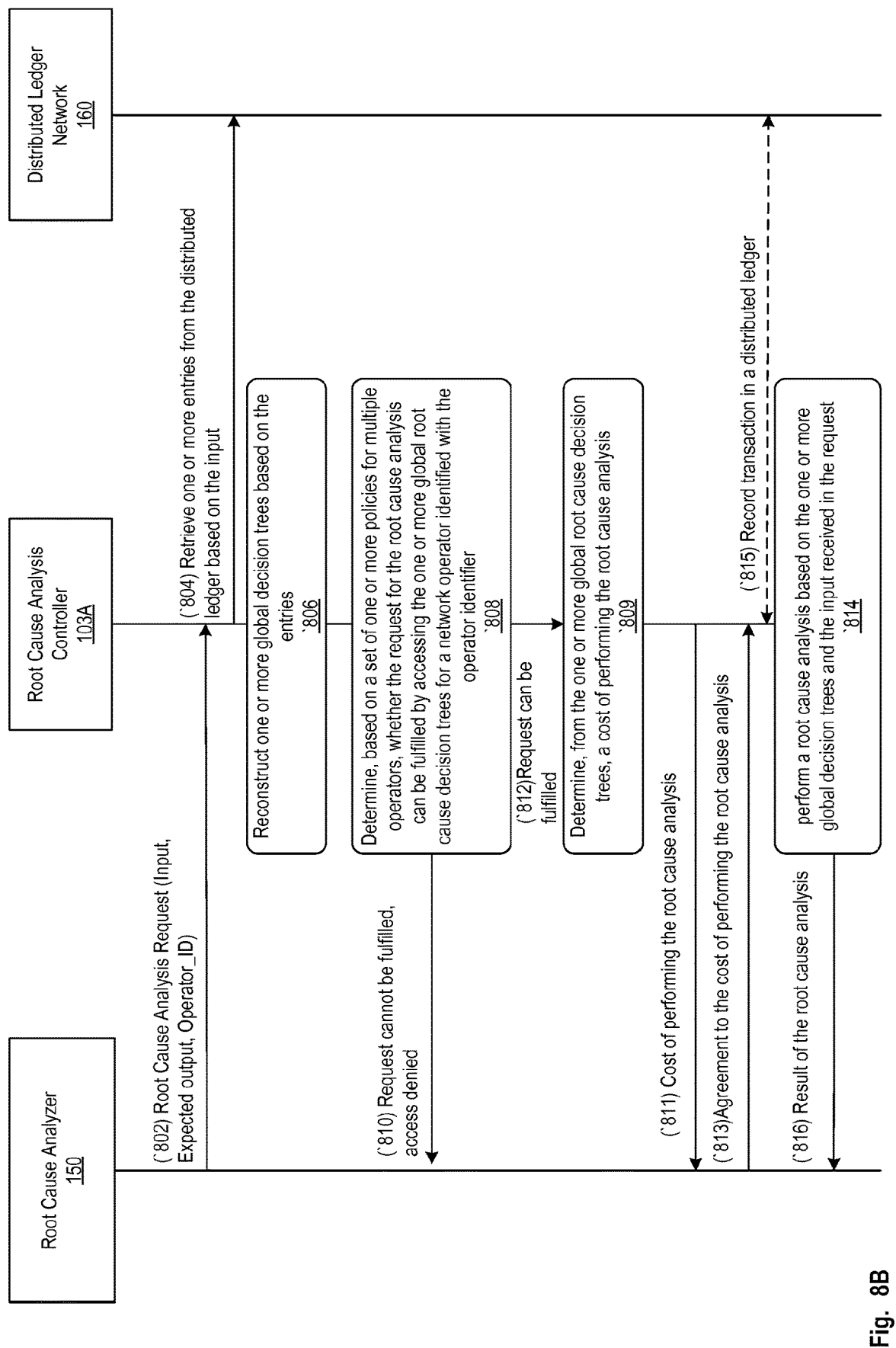
FIG. 8B illustrates a block diagram of exemplary transactions for requesting a root cause analysis based on a global root cause analysis tree stored in a distributed ledger network, in accordance with some embodiment.

In some embodiments, a different mechanism can be used when performing a root cause analysis for a given network. FIG. 8B illustrates a block diagram of exemplary transactions for performing a root cause analysis based on a global root cause decision tree stored in a distributed ledger network, according to a second embodiment. The embodiment described herein may allow network operator/owner of the decision tree to bill for use of the decision tress/nodes that they have generated and stored in the distributed ledger and/or to manage resources needed for performing the root cause analysis based on a cost determined for the operation. The embodiments described herein can enable a network operator to offer a new service for sharing their root cause analysis knowledge.

The existing distributed ledger that stores the root cause decision trees can also be used to record the service transactions performed between an owner of the decision tree and a requestor that would like to access the decision tree for performing root cause analysis. Specifically, the decision service endpoint can be extended with billing information.

In this embodiment, the RCA controller 103A performs the same operations 804-812 as described with reference to FIG. 8A. Upon determining that the request can be fulfilled, at operation 812, the flow of operations moves to operation 809, at which the RCA controller 103A determines, for the selected global root cause decision trees, a cost of performing the root cause analysis.

In some embodiments, the cost of performing the root cause analysis can include a fee for execution of one more decision modules. The fee can be determined for a number of requests per an interval of time for the given requestor. In some embodiments, several structures can be put in place for setting the fee. For example, different billing groups can be involved in the root cause analysis process. For example, when different network operators have contributed to the generation of the global root cause decision tree, the fee information can be set based on these multiple operators. The fee can also be set based on the type of requestor. For example, when the requestor is the network operator that has also generated the global root cause decision tree, there may be no fee associated with the use of the decision tree. Alternatively, when the requestor is an entity that is different from the network operator that generated the global root cause decision tree, a fee is set for this requestor.

In other embodiments, the cost can be different than a fee charged to the requestor, instead, the cost can be an infrastructure requirement that needs to be satisfied by the requestor prior to accessing the root cause decision tree (e.g., the cost can be electricity, network or computational requirements, etc.).

Figure 8C:
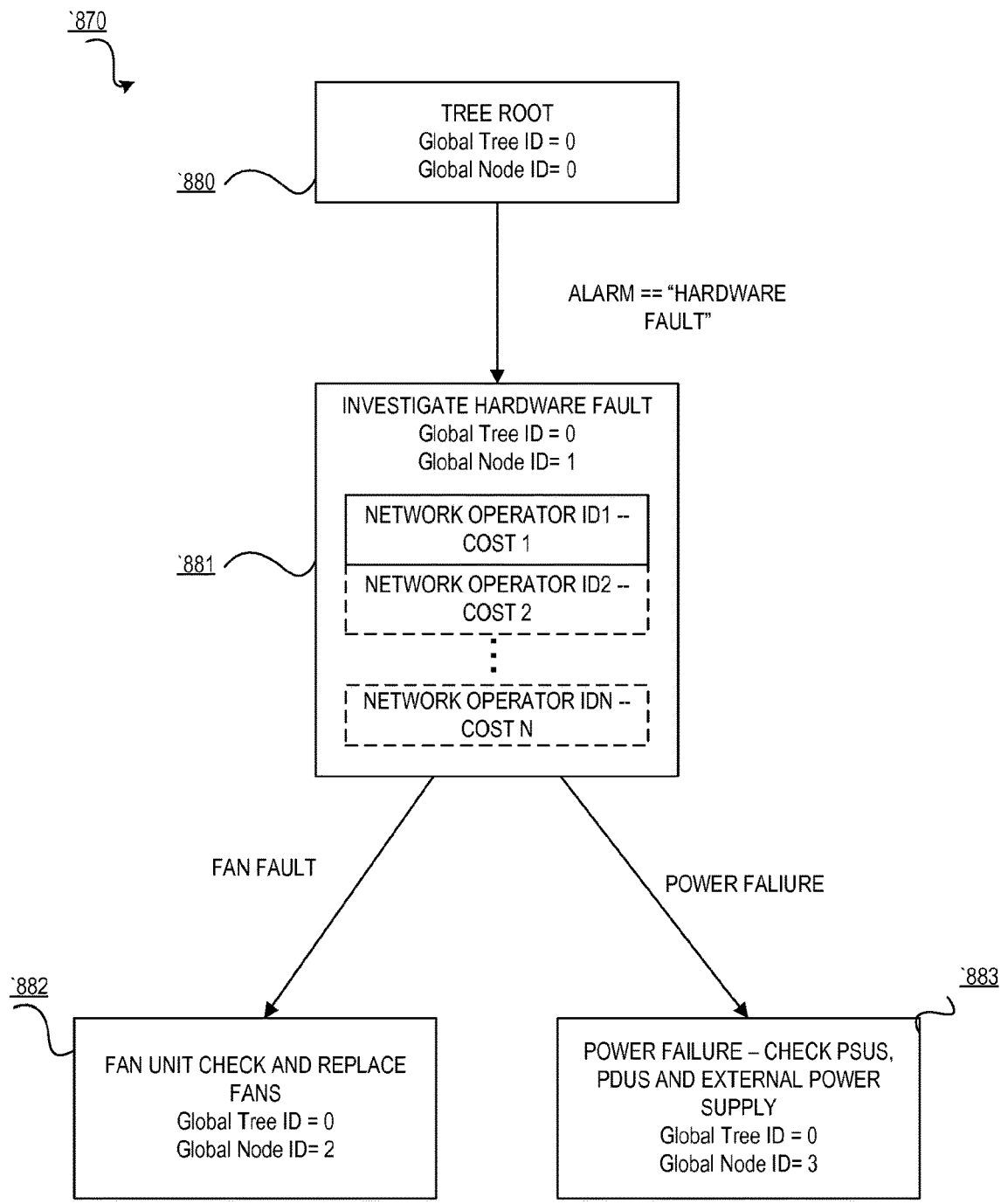
FIG. 8C illustrates an exemplary global root cause decision tree that includes a cost for executing the decision module indicated in a decision node, in accordance with some embodiments.

FIG. 8C illustrates an exemplary global decision tree 870 that includes a cost for executing the decision module indicated in the decision node 881. The node 881 includes for a first network identifier ID1 an associated cost 1. As discussed above the cost can be a fee associated with the execution of the decision module for the network operator or alternatively a set of one or more requirements for the execution. The node 881 may also include one or more additional costs (e.g., cost N) for one or more operators that share the global decision tree with the first network operator. In some embodiments, the cost for each network operator can be the same. In other embodiments, at least two network operators may have different costs. While the illustrated example shows a single decision node 881 in the global decision tree 870, in other embodiments, the decision tree may include more than one decision node. In that case one or more additional decision nodes may also include a cost of executing their corresponding decision modules. In this case, the cost is determined based on the multiple costs of execution of multiple decision nodes in the tree. For example, the cost of each node can be added to the total cost of performing the root cause analysis based on the weight associated with its respective decision module.

Once the cost is determined for the network operator, the RCA controller 103A transmits, at operation 811, to the requestor the cost of performing the root cause analysis. Based on the cost the root cause analyzer 150 determines whether to enter in an agreement with the root cause analysis controller 103A and accept the terms established by the RCA controller 103A. The root cause analyzer 150 transmits an agreement to the cost at operation 813. Upon receipt of the agreement, the RCA controller 103A records the transaction in a distributed ledger. In some embodiments, the root cause analyzer 150 may further transmit in addition to the agreement, a payment method for processing the transaction (e.g., a credit card number, or another type of payment identifier). The RCA controller 103A may run the billing information and confirm the transaction. In some embodiments, the transaction can be recorded in the same distributed ledger as the global root cause decision tree. In alternative embodiments, the transaction can be recorded in a different distributed ledger of another distributed ledger network (not illustrated).

The operations move to operation 814, at which the RCA controller 103A performs the root cause analysis based on the global decision trees and the input received in the request from the root cause analyzer 150. The root cause analysis can be performed based on one or multiple decision modules. Finally, the RCA controller 103A transmits the result of the root cause analysis to the root cause analyzer 150, at operation 816.

Figure 9:
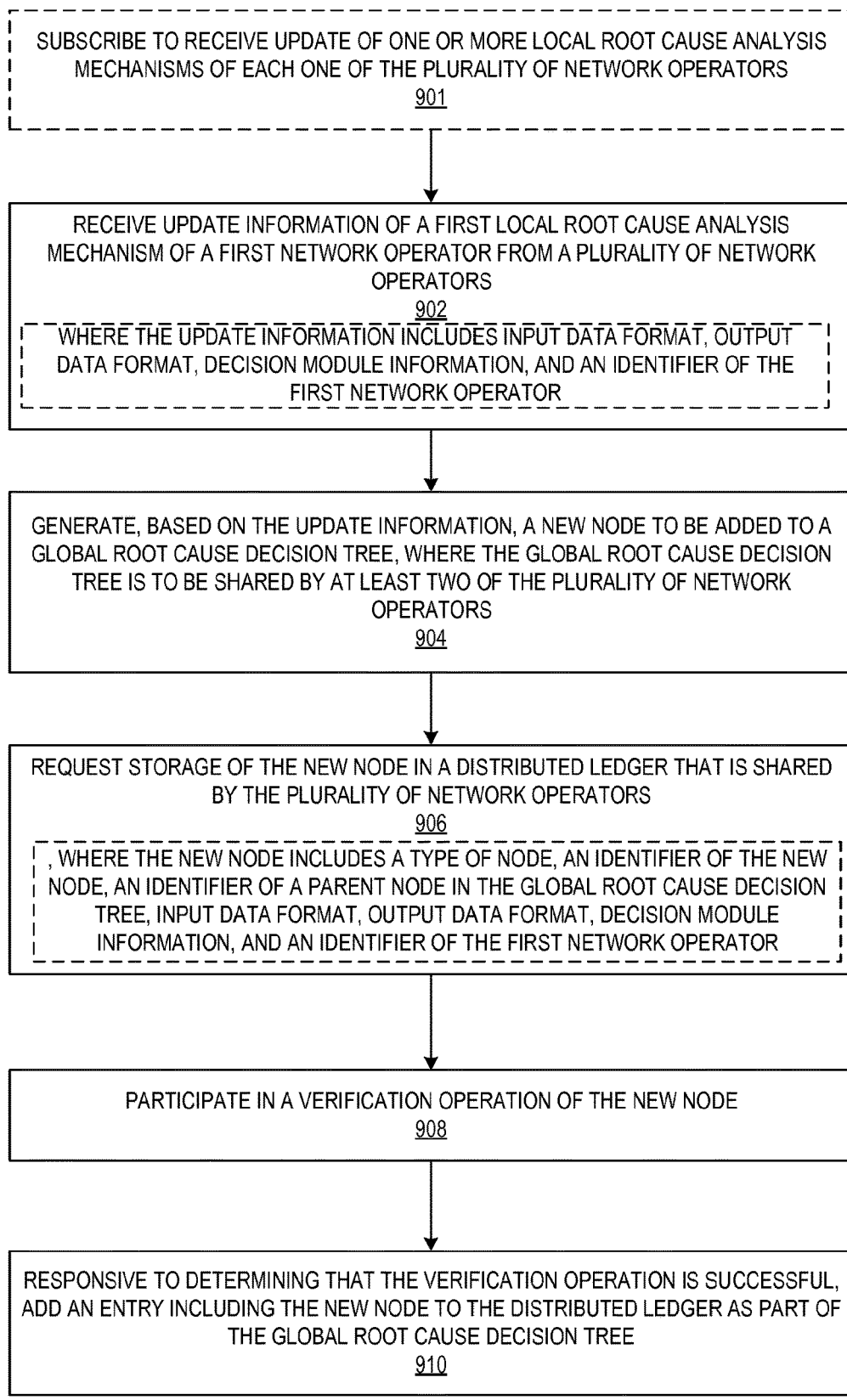
FIG. 9 illustrates a flow diagram of exemplary operations for enabling root cause analysis across multiple network systems, in accordance with some embodiments.

FIG. 9 illustrates a flow diagram of exemplary operations for enabling root cause analysis across multiple network systems, in accordance with some embodiments. The embodiments described herein will be described with reference to the RCA controller 103A of the network 130A. However, one of ordinary skill in the art would understand that this is intended to be exemplary only and the operations below can be performed by any RCA controller that serves one or more network operators.

At operation 902, the RCA controller 103A receives update information of a first local root cause analysis mechanism 105A of a first network operator 106A from multiple network operators 106A-B. The update information includes input data format, output data format, decision module information, and an identifier of the first network operator.

At operation 904, the RCA controller 103A generates, based on the update information, a new node to be added to a global root cause decision tree. The global root cause decision tree is to be shared by at least two of the multiple network operators.

At operation 906, the RCA controller 103A requests storage of the new node in a distributed ledger that is shared by the network operators. The new node includes a type of node, an identifier of the new node, an identifier of a parent node in the global root cause decision tree, input data format, output data format, decision module information, and an identifier of the first network operator. The new node is determined at least in part based on the update information received from the NEU 102A. For example, the input data format and the output data format are respectively determined based on the input and the output included in the update information.

At operation 908, the RCA controller 103A participates in a verification operation of the new node. Responsive to determining that the verification operation is successful, the RCA controller 103A adds, at operation 910, an entry including the new node to the distributed ledger as part of the global root cause decision tree.

The verification operation can be performed through one of several embodiments by the RCA controller 103A depending on whether or not the node to be added to the global decision tree is an update to an existing node or not. FIG. 10A illustrates a flow diagram of exemplary operations for participating in a verification operation of a new node, in accordance with some embodiments. FIG. 10A illustrates a first embodiment, in which the new node is not an updated to an existing node in the global decision tree.

At operation 1002, the RCA controller 103A determines whether the new node is an update to an existing node that is part of the global root cause decision tree in the distributed ledger.

Responsive to determining that the new node is not an update to an existing node, the RCA controller 103A performs, a set of operations 1004. The operations 1004 include operation 1006, at which, the RCA controller 103A supplies test data. At operation 1008, the RCA controller 103A performs a root cause analysis based on the test data and the global root cause decision tree when including the new node. At operation 1010, the RCA controller 103A determines, based on a result of the root cause analysis and by one or more additional results of root cause analysis performed by one or more other network nodes in the distributed ledger, whether the new node is a legitimate node that can be added as an entry in the global root cause decision tree. In this embodiment, to determine that the verification operation is successful includes determining, operation 1012, that the new node is a legitimate node that can be added as an entry in the global root cause decision tree.

FIG. 10B illustrates a flow diagram of exemplary operations for participating in a verification operation of a new node, in accordance with some embodiments. The operations of FIG. 10B are performed when the new node is not an update to an existing node, but a different verification mechanism is used than the one used in the operations of FIG. 10A. In some embodiments, an RCA controller such as 103A or 103B can be operative to perform one of or both verification mechanisms described in FIG. 10A and FIG. 10B. In some embodiments, the RCA controller can be operative to perform only one of the sets of operations. In other embodiment, the RCA controller can be operative to perform either one of the mechanisms depending on several criteria. For example, in some embodiments, the strategy to choose depends on the complexity of the global root cause decision tree and also whether the network operator has insight into what the decision node actually does. When a network operator has insight into the operations of the decision node, the test data can be selected for the decision node without the need for selecting. For example, for less complex global root cause decision trees (e.g., trees with smaller number of leaf nodes), and decision nodes where the operator has insight into the purpose of the decision operation, an RCA controller may be operative to use the operations of FIG. 10B instead of the operations of FIG. 10A. This determination can be performed automatically by the RCA controller based on the root cause decision tree and test data.

At operation 1002, the RCA controller 103A determines whether the new node is an update to an existing node that is part of the global root cause decision tree in the distributed ledger. Responsive to determining that the new node is not an update to an existing node, perform, the RCA controller 103A performs operations 1004. At operation 1016, the RCA controller 103A supplies test data. The RCA controller 103A determines, at operation 1018, based on the test data and decision module information of the new node and by one or more additional results of root cause analysis performed by one or more other network nodes in the distributed ledger, whether the new node is a legitimate node that can be added as an entry in the global root cause decision tree. Thus as opposed to the previous embodiment, in which the test data is used based on the entire decision tree and the new node to determine whether the new node is legitimate, in this embodiment, the determination is performed only based on the decision module information that is stored in the new node only. This may make the process of data retrieval from the DL faster enabling a faster and more efficient determination of the legitimacy of the new node. In this embodiment, determining that the verification operation is successful includes determining, at operation 1012, that the new node is a legitimate node that can be added as an entry in the global root cause decision tree.

FIG. 10C illustrates a flow diagram of exemplary operations for participating in a verification operation of a new node, in accordance with some embodiments. The operations of FIG. 10C are performed when the new node is an update to a node that already exist in the global root cause decision tree.

At operation 1002, the RCA controller 103A determines whether the new node is an update to an existing node that is part of the global root cause decision tree in the distributed ledger. Responsive to determining that the new node is an update to an existing global node, the RCA controller 103A performs the operations 1024. The operations 1024 include operation 1026, at which the RCA controller 103A determines whether the input data format and the output data format of the new node are respectively identical to input data format and output data format of the existing node. Responsive to determining that the input data format and the output data format of the new node are respectively identical to the input data format and output data format of the existing node, the RCA controller 103A updates the new node to include a bias. The bias is used to determine which one of the existing global node and the new node is to be used when performing a root cause analysis. Alternatively, responsive to determining that the input data format and the output data format of the new node are not respectively identical to the input data format and output data format of the existing node, the RCA controller 103 updates, at operation 1030, the new node to include a bias and a conversion parameter. When the new node is determined to be an update to an existing node and the input data format and output data format of this new node are not identical to the input and output data format of the existing this indicates that the input and output data formats of the new node are similar to the input and output data format of the existing node. When the input/output data formats are similar to input/output data formats of the existing node, a conversion mechanism may exist to transform the input/output from the first format (of the new node) to the second format (of the existing node).

The bias is used when performing a root cause analysis based on at least one of the existing node and the new node, the conversion parameter allows to convert data from the existing node into a format that is compatible with a format of data from the new node. For example, the conversion parameter may include a location of a network resource that stores conversion formulae for converting the first input/output into the second input/outputs. In some embodiments, the RCA controller can determine whether there is a conversion mechanism or not for converting the input/output data format of the new node into an input/output data format of the existing node. When the conversion mechanism is determined, the RCA controller updates the conversion parameter of the new node to indicate which conversion mechanism is to be used. In an alternative embodiment, conversion may not be possible, and in this case the new node can either be replaced, or the new node needs to be added in a new tree that is independent of the tree of the existing node.

After determination of the new node (either including the conversion parameter or not), the flow of operations moves to operation 1032, at which the RCA controller 103 supplies test data. At operation 1034, the RCA controller 103A performs a root cause analysis based on the test data and the global root cause decision tree when including the new node. At operation 1036, the RCA controller 103A determines, based on a result of the root cause analysis and by one or more additional results of root cause analysis performed by one or more other network nodes in the distributed ledger, whether the new node is a legitimate node that can be added as an entry in the global root cause decision tree.

In these embodiments, to determine that the verification operation is successful includes determining that the new node is a legitimate node that can be added as an entry in the global root cause decision tree. Further, depending on whether or not the new node is updated to include the conversion parameter and the bias, or the bias only, the new node is added to the distributed ledger either with the bias and the conversion parameter or with the bias only.

Figure 11:
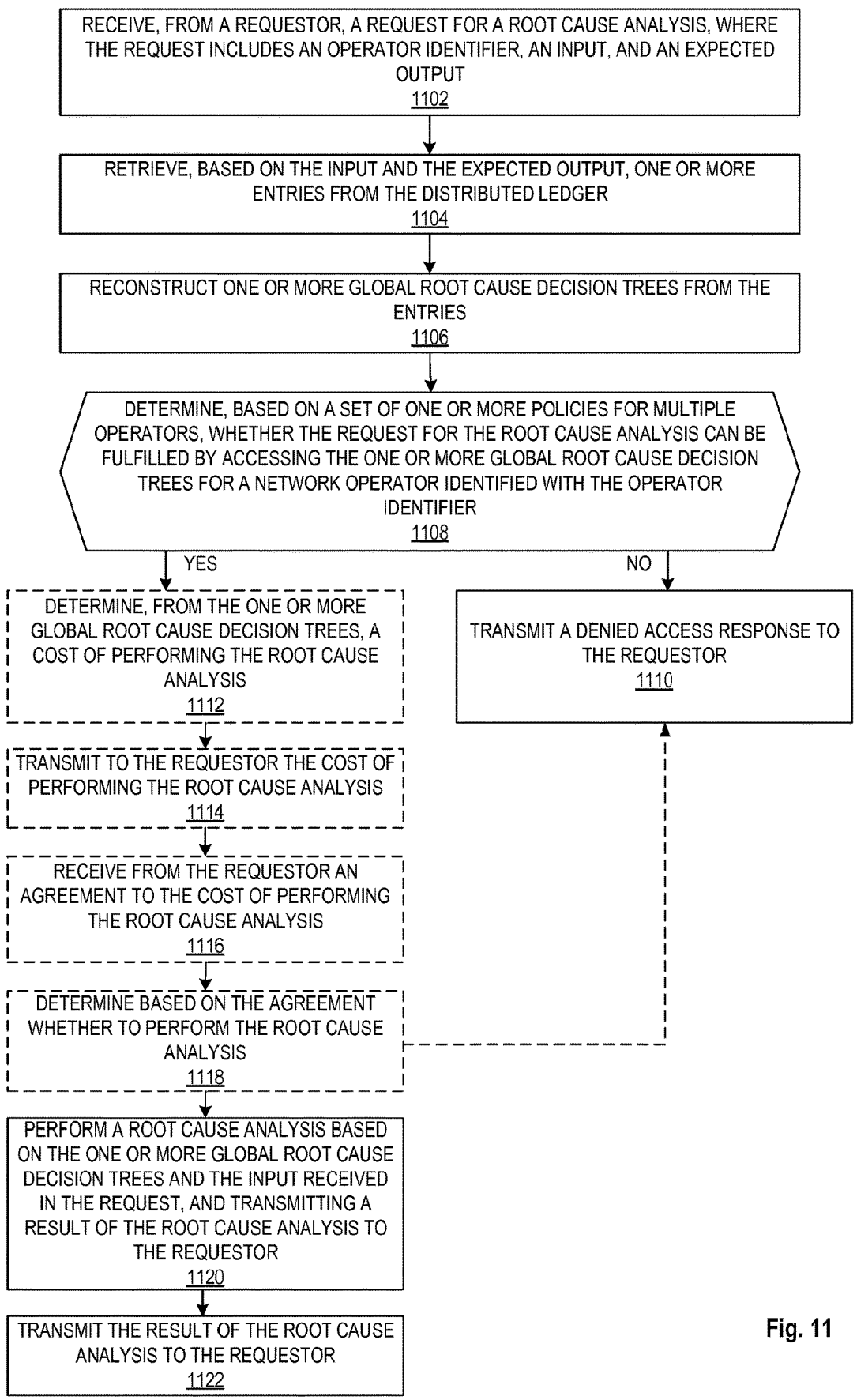
FIG. 11 illustrates a flow diagram of exemplary operations for requesting a root cause analysis based on a global root cause analysis tree stored in a distributed ledger network, in accordance with some embodiment.

Once the RCA controllers have populated the distributed ledger with one or more global root cause analysis, the distributed ledger can be queried to perform root cause analysis for a network. FIG. 11 illustrates a flow diagram of exemplary operations for requesting a root cause analysis based on a global root cause analysis tree stored in a distributed ledger network, in accordance with some embodiment. At operation 1102, an RCA controller (e.g., RCA Controller 103A) receives from a requestor (e.g., the root cause analyzer 150), a request for a root cause analysis. The request includes a network operator identifier, an input, and an expected output. In some embodiments, the root cause analyzer 150 can be an entity owned and operated by the network operator. In other embodiments, the root cause analyzer 150 can be an entity independent of the network operator but authorized to perform root cause analysis for the network operator. For example, the root cause analyzer 150 can be a network node of third-party service. The root cause analyzer 150 can be a baseband network node that is operative to establish, based on a set of alarms, the root cause of these alarms. The RCA controller 103A exposes an interface for accepting root cause analysis requests. In some embodiments, the interface can be a REST API. The request includes the symptoms, e.g., the input and the expected output, as well as a network operator identifier. The identifier identifies the network operator that owns or operates the network for which the root cause is to be performed.

At operation 1104, the RCA controller 103A retrieves based on the input and the expected output, one or more entries from the distributed ledger. For example, upon receipt of a request for a root cause analysis, the RCA controller 103A can retrieve the three blocks of FIG. 4 that correspond to a global root cause decision tree. The selection of the entries can be done using a combination of symptoms (i.e. input to tree) and expected output.

The flow moves to operation 1106, at which the RCA controller 103A reconstructs one or more global root cause decision trees from the entries. For example, the RCA controller 103A can reconstruct the tree illustrated in FIG. 2B or alternatively the decision tree 870 of FIG. 8C.

At operation 1108, the RCA controller 103A determines, based on a set of one or more policies for multiple operators, whether the request for the root cause analysis can be fulfilled by accessing the global root cause decision trees for a network operator identified with the operator identifier. The policy check can be performed in two-stages. In a first stage, for the given selected tree, the identifier of each network operator that is allowed to access the decision tree is extracted. In some embodiments, the Home Network Identifier (HNI) of all participating network operators is extracted, then the MCC is determined from the HNI. The RCA controller 103A determines whether the identifier of the network operators that are allowed to access the decision tree and the identifier of the network operator included in the request all belong in the same geofencing policy. If it is determined that the identifier of the network operator belongs to the same geofencing policy as the identifiers of the network operators allowed to access the decision tree, the RCA controller 103A proceeds to checking multilateral agreements, otherwise the operations move to operation 1110 and the RCA controller 103A transmits a "denied access" response to the requestor 150.

In a second stage, a determination is performed based on the identifier of the network operator included in the request and the tree IDs are checked against the network operator policies that are stored in a distributed ledger. If for the given decision tree, the identifier of the network operator is included in the set identifiers of network operators that are allowed to access the decision tree, then policy control is complete and the RCA controller 103A can proceed to the next operation 1112 or alternatively 1120. Alternatively, if for the given decision tree, the identifier of the network operator is not included in the set identifiers of network operators that are allowed to access the decision tree, then policy control is complete and the operations move to operation 1110, at which the RCA controller 103A transmits a "denied access" response to the requestor 150.

Responsive to determining that the request can be fulfilled, the RCA controller 103A can perform the root cause analysis based on one or more embodiments. In a first embodiment, the root cause analysis is performed by executing operation 1120-1122. In a second embodiment, the root cause analysis is performed by executing operations 1112-1122.

At operation 1120, the RCA analyzer 103A performs the root cause analysis based on the global root cause decision trees and the input received in the request. At operation 1122, the RCA analyzer 103A transmits a result of the root cause analysis to the requestor 150. In some embodiments, the RCA controller 103A may retrieve a single decision tree for the request from the distributed ledger. In these embodiments, the root cause analysis is performed based on this single decision tree. In other embodiments, the RCA controller 103A can retrieve more than one decision tree for the request. For example, two trees can be retrieved. As illustrated in FIG. 6, multiple nodes of different trees can be stored in the distributed ledger, for example, some nodes may include a bias that can be used to determine how to perform the root cause analysis. In these embodiments, the root cause analysis is performed by taking into consideration the bias associated for the nodes.

In one embodiment, the bias indicates a weight associated for a particular parameter of a node in the tree. For example, the weight can be associated with the decision module information of anode. In the example of FIG. 6, a weight is associated with each possible decision module included in the decision module information, such that a single one of the decision modules can be selected over the other one based on this weight.

While in some embodiments, the bias is used as a zero-sum choice, causing only a single one of the nodes to be selected based on the weight (e.g., the node with the highest weight), in other embodiments, the weights can be used to determine an average output value. In a non-limiting example, the bias is selected such that a first decision node has a 0.6 weight and a second decision node has a weight of 0.4 indicating that the output of first decision node will be taken into account 60% and output of the second 40%. In one example, if the first node outputs 40 degrees Celsius and the second node outputs 30 degrees Celsius, an RCA controller can determine an average output value based on the weights assigned for each one, for example, the average output is determined based on the weights: ((0.6*40)+(0.4*30))=36 degrees Celsius.

In the second embodiments, operations 1112 to 1122 are performed. The embodiment described herein may allow network operator/owner of the decision tree to bill for use of the decision tress/nodes that they have generated and stored in the distributed ledger and/or to manage resources needed for performing the root cause analysis based on a cost determined for the operation. The embodiments described herein can enable a network operator to offer a new service for sharing their root cause analysis knowledge.

The existing distributed ledger that stores the root cause decision trees can also be used to record the service transactions performed between an owner of the decision tree and a requestor that would like to access the decision tree for performing root cause analysis. Specifically, the decision service endpoint can be extended with billing information.

In this embodiment, upon determining that the request can be fulfilled, the flow of operations moves to operation 1112, at which the RCA controller 103A determines, for the selected global root cause decision trees, a cost of performing the root cause analysis.

In some embodiments, the cost of performing the root cause analysis can include a fee for execution of one more decision modules. The fee can be determined for a number of requests per an interval of time for the given requestor. In some embodiments, several structures can be put in place for setting the fee. For example, different billing groups can be involved in the root cause analysis process. For example, when different network operators have contributed to the generation of the global root cause decision tree, the fee information can be set based on these multiple operators. The fee can also be set based on the type of requestor. For example, when the requestor is the network operator that has also generated the global root cause decision tree, there may be no fee associated with the use of the decision tree. Alternatively, when the requestor is an entity that is different from the network operator that generated the global root cause decision tree, a fee is set for this requestor.

In other embodiments, the cost can be different than a fee charged to the requestor, instead, the cost can be an infrastructure requirement that needs to be satisfied by the requestor prior to accessing the root cause decision tree (e.g., the cost can be electricity, network or computational requirements, etc.).

The second embodiment can be illustrated with reference to the global decision tree 870 of FIG. 8C. The node 881 includes for a first network identifier ID1 an associated cost 1. As discussed above the cost can be a fee associated with the execution of the decision module for the network operator or alternatively a set of one or more requirements for the execution. The node 881 may also include one or more additional costs (e.g., cost N) for one or more operators that share the global decision tree with the first network operator. In some embodiments, the cost for each network operator can be the same. In other embodiments, at least two network operators may have different costs. While the illustrated example shows a single decision node 881 in the global decision tree 870, in other embodiments, the decision tree may include more than one decision node. In that case one or more additional decision nodes may also include a cost of executing their corresponding decision modules. In this case, the cost is determined based on the multiple costs of execution of multiple decision nodes in the tree. For example, the cost of each node can be added to the total cost of performing the root cause analysis based on the weight associated with its respective decision module.

Once the cost is determined for the network operator, the RCA controller 103A transmits, at operation 114, to the requestor the cost of performing the root cause analysis. When the requestor agrees to the cost and/or requirements set by the RCA controller 103A, the RCA controller 103A receives, at operation 1116, the agreement to the cost set for performing the root cause analysis. The RCA controller 103A determines, at operation 1118, based on the agreement whether to perform the root cause analysis. For example, if the requestor has accepted all the terms of the cost, the RCA controller can record the transaction in a distributed ledger and perform the root cause analysis. Alternatively, if the requestor does not accept all the terms, the RCA controller may deny access to the decision tree and does not perform the root cause analysis. In some embodiments, the root cause analyzer 150 may further transmit in addition to the agreement, a payment method for processing the transaction (e.g., a credit card number, or another type of payment identifier). The RCA controller 103A may run the billing information and confirm the transaction. In some embodiments, the transaction can be recorded in the same distributed ledger as the global root cause decision tree. In alternative embodiments, the transaction can be recorded in a different distributed ledger of another distributed ledger network (not illustrated).

The operations move to operation 1120, at which the RCA controller 103A performs the root cause analysis based on the global decision trees and the input received in the request from the root cause analyzer 150. The root cause analysis can be performed based on one or multiple decision modules. Finally, the RCA controller 103A transmits the result of the root cause analysis to the root cause analyzer 150, at operation 1122.

Figure 12:
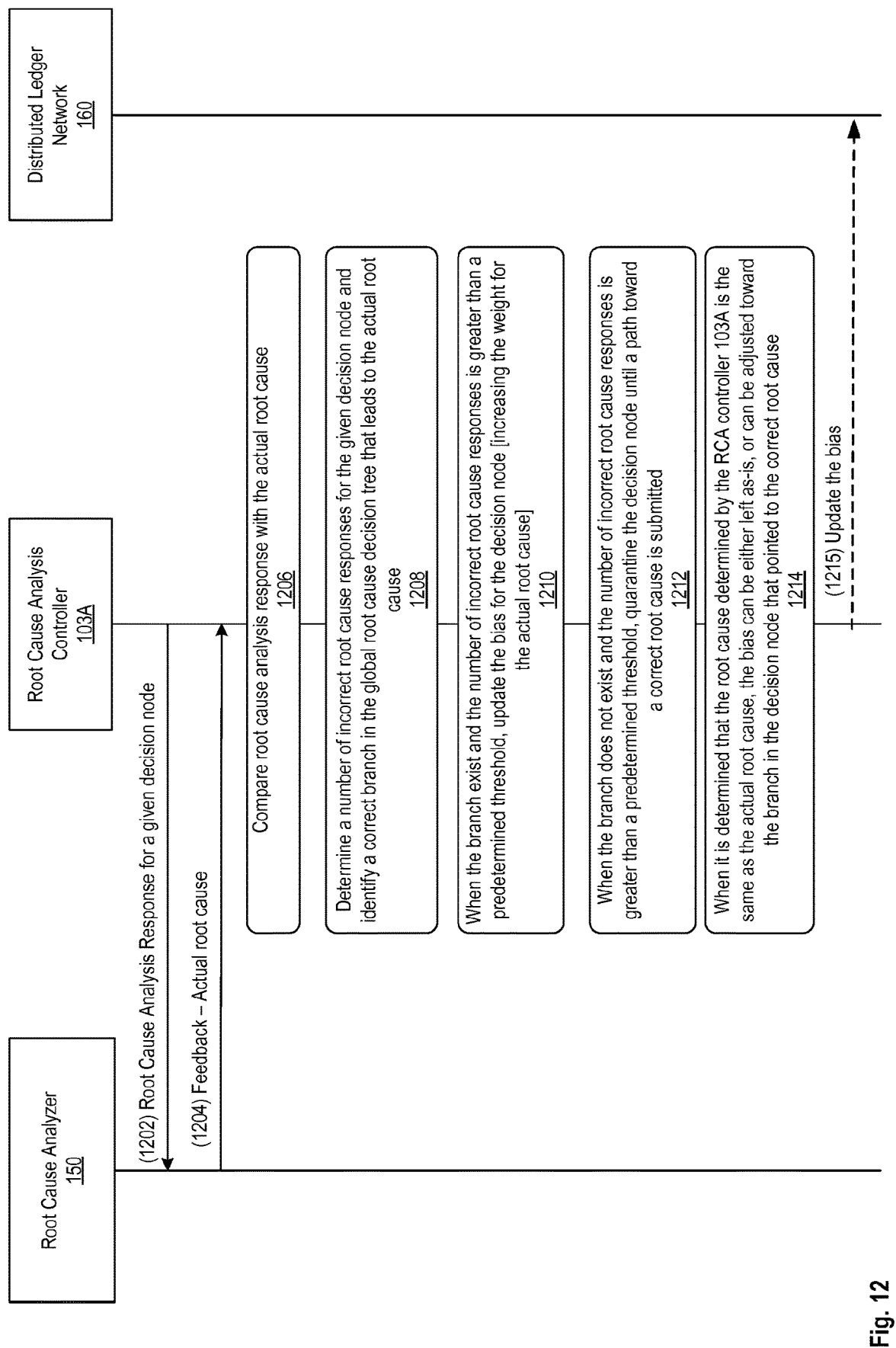
FIG. 12 illustrates a block diagram of exemplary transactions for adjusting a bias for a node of a root cause decision tree, in accordance with one embodiment.

In some embodiments, when the global root cause decision tree includes one or more nodes with a bias (e.g., weights associated with two or more options for the node), the RCA controller 103A can be operative to update the bias continuously based on new data received in the system. FIG. 12 illustrates a block diagram of exemplary transactions for adjusting a bias for a node of a root cause decision tree, in accordance with one embodiments. Upon performing a root cause analysis in response to a request from the root cause analyzer and establishing the root cause, the RCA controller 103A transmits, at operation 1202, the response including the root cause to the root cause analyzer 150. Subsequently, the root cause analyzer 150, establishes the actual root cause. The root cause analyzer 150 transmits the actual root cause to the RCA controller 103A.

At operation 1206, the root cause analyzer 103A compares the root cause sent in the response with the actual root cause. In case the actual root cause is not the same as the one that was found by the RCA controller 103A, either the bias values set for the associated decision node are not correct, and another tree branch was followed, or that the "right" branch does not yet exist. Therefore the flow of operations moves to operation 1208, at which the RCA controller 103A determines a number of incorrect root cause responses for the given decision node and identify a correct branch in the global root cause decision tree that leads to the actual root cause.

When RCA controller 103A determines that the branch exists, and the number of incorrect root cause responses is greater than a predetermined threshold, it updates the bias for the decision node accordingly. The RCA controller increases the bias of those models that made the right decision (the right branching in the tree) to reflect the correctness of the root cause.

When RCA controller 103A determines that the branch does not exist, and the number of incorrect root cause responses is greater than a predetermined threshold, the RCA controller 103A may choose to quarantine this decision node until a path toward a correct root cause is submitted. When a decision nodes is quarantined, while it remains stays in the distributed ledger and is constructed upon a root cause analyzer's request, the RCA controller 103A returns an "inconclusive" response back to the root cause analyzer 150. The inconclusive response indicates that the root cause cannot be established with the current knowledge recorded in the distributed ledger.

When it is determined, at operation 1214, that the root cause determined by the RCA controller 103A is the same as the actual root cause, the bias can be either left as-is, or can be adjusted (operation 1215) toward the branch in the decision node that pointed to the correct root cause.

Architecture

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors/processing circuitry (e.g., wherein a processor is a microprocessor, controller, microcontroller, central processing unit, digital signal processor, application specific integrated circuit, field programmable gate array, other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of receiving data from other electronic devices over a wireless connection and/or sending data out to other devices via a wireless connection. This radio circuitry may include transmitter(s), receiver(s), and/or transceiver(s) suitable for radio frequency communication. The radio circuitry may convert digital data into a radio signal having the appropriate parameters (e.g., frequency, timing, channel, bandwidth, etc.). The radio signal may then be transmitted via antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate via wire through plugging in a cable to a physical port connected to a NIC. One or more parts of an embodiment of the inventive concept may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video, etc.). In the embodiments described above the components of the DLT network 100 can be implemented on one or more network devices coupled in a network.

Figure 13:
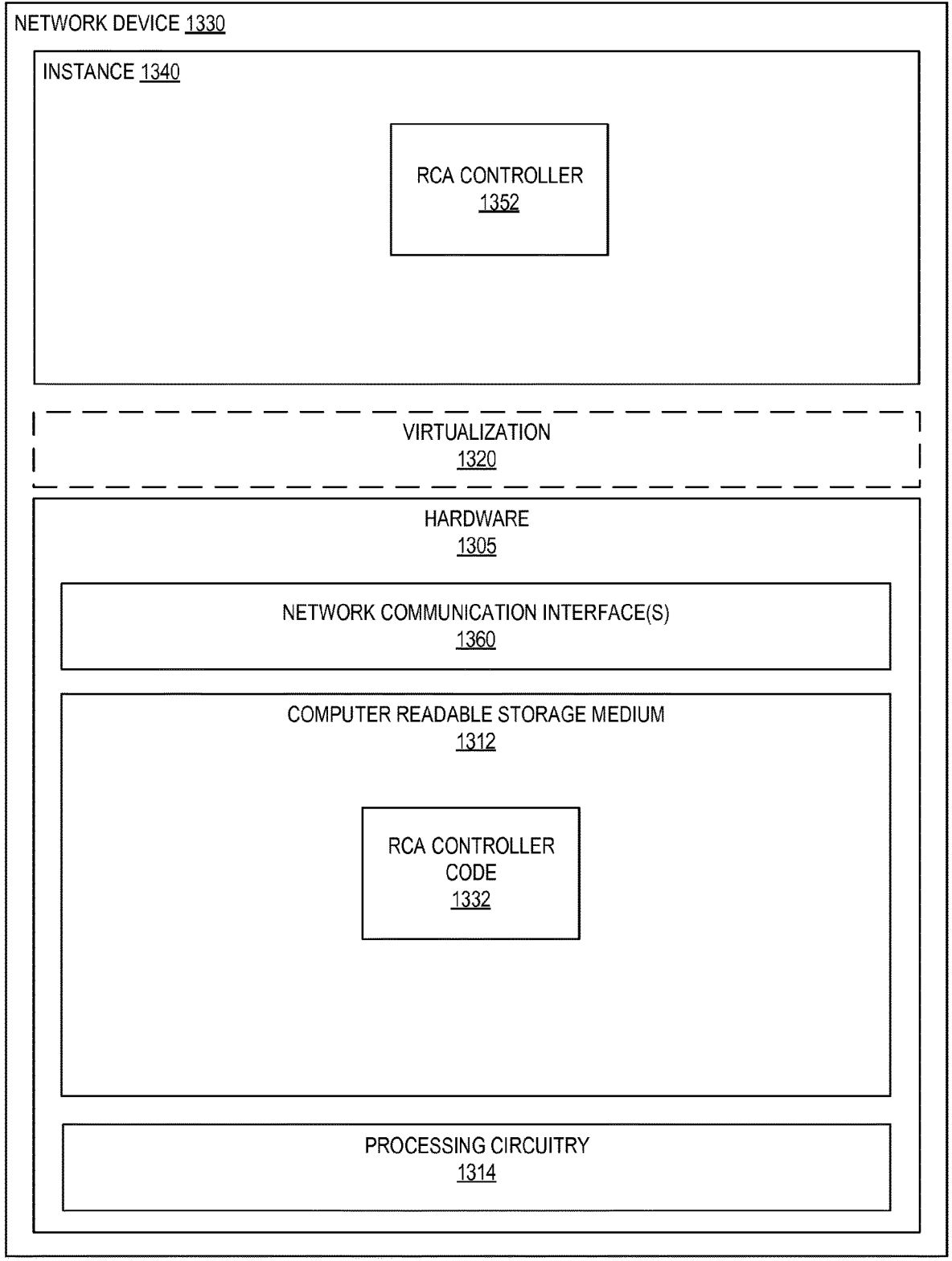
FIG. 13 illustrates a block diagram for a network device that can be used for implementing one or more of the network devices described herein, in accordance with some embodiments.

FIG. 13 illustrates a block diagram for a network device that can be used for implementing one or more of the network devices described herein, in accordance with some embodiments. The network device 1330 may be a web or cloud server, or a cluster of servers, running on server hardware. According to one embodiment, the network device is a server device which includes hardware 1305. Hardware 1305 includes processing circuitry 1314, network communication interfaces 1360 coupled with a computer readable storage medium 1312. The computer readable storage medium 1312 may include RCA controller code 1332. In some embodiments, the various codes stored in the computer readable storage medium 1312 can be stored in separate readable storage media elements such that the different component are physically separate from one another.

While one embodiment does not implement virtualization, alternative embodiments may use different forms of virtualization—represented by a virtualization layer 1320. In these embodiments, the instance 1340 and the hardware that executes it form a virtual server which is a software instance of the modules stored on the computer readable storage medium 13712.

The RCA controller code 1332 includes instructions which when executed by the hardware 1305 causes the instance 1340 to implement an RCA controller 1352 that is operative to perform the operations performed by a one or more RCA controllers 103A-N described with reference to FIGS. 1-12.

While the flow diagrams in the figures show a particular order of operations performed by certain embodiments of the inventive concept, it should be understood that such order is exemplary (e.g., alternative embodiments may perform the operations in a different order, combine certain operations, overlap certain operations, etc.).

While the inventive concept has been described in terms of several embodiments, those skilled in the art will recognize that the inventive concept is not limited to the embodiments described, can be practiced with modification and alteration within the spirit and scope of the appended claims. The description is thus to be regarded as illustrative instead of limiting.

The invention claimed is:

1. A method performed by a network node for enabling root cause analysis in across a plurality of network systems, the method comprising:
receiving update information of a first local root cause analysis mechanism of a first network operator of a plurality of network operators;
generating, based on the update information, a new node to be added to a global root cause decision tree, wherein the global root cause decision tree is to be shared by the first network operator and at least one other network operator of the plurality of network operators;
requesting storage of the new node in a distributed ledger that is shared by the plurality of network operators;
participating in a verification operation of the new node based upon first results of root cause analysis performed by the first local root cause analysis mechanism of the first network operator and additional results of root cause analysis performed by a second local root cause analysis mechanism of the at least one other network operator, wherein the first local root cause analysis mechanism and the second local root cause analysis mechanism are different, and wherein the verification operation is successful based upon both the first results and the additional results identifying the new node as a root cause; and
responsive to determining that the verification operation is successful, adding the new node to the distributed ledger as part of the global root cause decision tree.

2. The method of claim 1, wherein the update information includes input data format, output data format, decision module information, and an identifier of the first network operator, and wherein the new node includes a type of node, an identifier of the new node, an identifier of a parent node in the global root cause decision tree, input data format, output data format, decision module information, and an identifier of the first network operator.

3. The method of claim 1, wherein the new node includes a type of node, an identifier of the new node, an identifier of a parent node in the global root cause decision tree, input data format, output data format, decision module information, and an identifier of the first network operator.

4. The method of claim 3, wherein the participating in the verification operation of the new node includes:
responsive to determining that the new node is not an update to an existing node, performing the following:
supplying test data; and
performing a root cause analysis based on the test data and the global root cause decision tree, when including the new node, to determine whether the verification operation is successful.

5. The method of claim 3, wherein the participating in the verification operation of the new node includes:
responsive to determining that the new node is not an update to an existing node, performing the following:
supplying test data; and
determining, based on the test data and decision module information of the new node whether the verification operation is successful.

6. The method of claim 3, wherein the participating in the verification operation of the new node includes:
responsive to determining that the new node is an update to an existing node, performing the following:
determining whether the input data format and the output data format of the new node are respectively identical to input data format and output data format of the existing node; and
responsive to determining that the input data format and the output data format of the new node are respectively identical to the input data format and output data format of the existing node, updating the new node to include a bias, wherein the bias is used to determine which one of the existing node and the new node is to be used when performing a root cause analysis.

7. The method of claim 6, wherein responsive to determining that the input data format and the output data format of the new node are not respectively identical to the input data format and output data format of the existing node, updating the new node to include a bias and a conversion parameter, wherein the bias is used when performing a root cause analysis based on at least one of the existing node and the new node, and wherein the conversion parameter converts data from the existing node into a format that is compatible with a format of data from the new node.

8. A network node for enabling root cause analysis in across a plurality of network systems, the network node comprising:
processing circuitry; and
a computer memory storing a set of computer readable instructions that when executed by the processing circuitry cause the network node to:
receive update information of a first local root cause analysis mechanism of a first network operator of a plurality of network operators;
generate, based on the update information, a new node to be added to a global root cause decision tree, wherein the global root cause decision tree is to be shared by the first network operator and at least one other network operator of the plurality of network operators;
request storage of the new node in a distributed ledger that is shared by the plurality of network operators;
participate in a verification operation of the new node based upon first results of root cause analysis performed by the first local root cause analysis mechanism of the first network operator and additional results of root cause analysis performed by a second local root cause analysis mechanism of the at least one other network operator, wherein the first local root cause analysis mechanism and the second local root cause analysis mechanism are different, and wherein the verification operation is successful based upon both the first results and the additional results identifying the new node as a root cause; and
responsive to determining that the verification operation is successful, add the new node to the distributed ledger as part of the global root cause decision tree.

9. The network node of claim 8, wherein the update information includes input data format, output data format, decision module information, and an identifier of the first network operator, and wherein the new node includes a type of node, an identifier of the new node, an identifier of a parent node in the global root cause decision tree, input data format, output data format, decision module information, and an identifier of the first network operator.

10. The network node of claim 8, wherein the new node includes a type of node, an identifier of the new node, an identifier of a parent node in the global root cause decision tree, input data format, output data format, decision module information, and an identifier of the first network operator.

11. The network node of claim 10, wherein to participate in the verification operation of the new node includes:
responsive to determining that the new node is not an update to an existing node, perform the following:
supply test data; and
perform a root cause analysis based on the test data and the global root cause decision tree, when including the new node, to determine whether the verification operation is successful.

12. The network node of claim 10, wherein to participate in the verification operation of the new node includes:
responsive to determining that the new node is not an update to an existing node, perform the following:
supply test data; and
determine, based on the test data and the decision module information of the new node whether the verification operation is successful.

13. The network node of claim 10, wherein to participate in the verification operation of the new node includes:
responsive to determining that the new node is an update to an existing node, perform the following:
determine whether the input data format and the output data format of the new node are respectively identical to input data format and output data format of the existing node; and
responsive to determining that the input data format and the output data format of the new node are respectively identical to the input data format and output data format of the existing node, update the new node to include a bias, wherein the bias is used to determine which one of the existing node and the new node is to be used when performing a root cause analysis.

14. The network node of claim 13, wherein responsive to determining that the input data format and the output data format of the new node are not respectively identical to the input data format and output data format of the existing node, update new node to include a bias and a conversion parameter, wherein the bias is used when performing a root cause analysis based on at least one of the existing node and the new node, and wherein the conversion parameter to convert data from the existing node into a format that is compatible with a format of data from the new node.

15. The network node of claim 11, wherein to determine whether the new node is an update to an existing node that is part of the global root cause decision tree includes performing operations to:
determine whether the input data format and the output data format of the new node are identical to input data format and output data format of the existing node.

16. The network node of claim 8, wherein the network node is further to:
receive, from a requestor, a request for a root cause analysis, wherein the request includes an operator identifier, an input, and an expected output;
retrieve, based on the input and the expected output, one or more entries from the distributed ledger;
reconstruct one or more global root cause decision trees from the entries;
determine, based on a set of one or more policies for multiple operators, whether the request for the root cause analysis can be fulfilled by accessing the one or more global root cause decision trees for a network operator identified with the operator identifier;
responsive to determining that the request can be fulfilled, perform a root cause analysis based on the one or more global root cause decision trees and the input received in the request, and transmit a result of the root cause analysis to the requestor; and
responsive to determining that the request cannot be fulfilled, transmit a denied access response to the requestor.

17. The network node of claim 16, wherein the network node is further to:
prior to transmitting the result of the root cause analysis to the requestor, perform the following:
determine, from the one or more global root cause decision trees, a cost of performing the root cause analysis;
transmit to the requestor the cost of performing the root cause analysis;
receive from the requestor an agreement to the cost of performing the root cause analysis; and
determine based on the agreement whether to perform the root cause analysis.

18. The network node of claim 8, wherein the network node is further to:
subscribe to receive update of one or more local root cause analysis mechanisms of each one of the plurality of network operators; and
wherein to receive the update information is a result of a subscription.

19. The network node of claim 8, wherein the distributed ledger is a blockchain and adding the new node to the distributed ledger includes generating a block based on the new node and adding the block to the blockchain.

* * * * *